US010550757B2

(12) United States Patent
Rabhi

(10) Patent No.: US 10,550,757 B2
(45) Date of Patent: Feb. 4, 2020

(54) VALVE IGNITION PRECHAMBER

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 0 days.

(21) Appl. No.: 15/864,735

(22) Filed: Jan. 8, 2018

(65) Prior Publication Data
US 2019/0072025 A1    Mar. 7, 2019

Related U.S. Application Data

(60) Provisional application No. 62/445,386, filed on Jan. 12, 2017.

(51) Int. Cl.
| | | |
|---|---|---|
| *F02B 19/18* | (2006.01) | |
| *F02B 19/12* | (2006.01) | |
| *F02B 1/04* | (2006.01) | |
| *F02B 17/00* | (2006.01) | |
| *F02M 57/06* | (2006.01) | |
| *F02F 1/24* | (2006.01) | |

(52) U.S. Cl.
CPC .............. *F02B 19/12* (2013.01); *F02B 1/04* (2013.01); *F02B 17/005* (2013.01); *F02B 19/18* (2013.01); *F02F 1/242* (2013.01); *F02M 57/06* (2013.01)

(58) Field of Classification Search
CPC ........ F02M 57/06; F02B 17/005; F02B 19/18
USPC .......................... 123/260, 266, 267, 275, 292
See application file for complete search history.

(56) References Cited

U.S. PATENT DOCUMENTS

| | | | |
|---|---|---|---|
| 3,459,217 A * | 8/1969 | Callahan .................. | F01M 1/08 137/512.1 |
| 4,124,000 A | 11/1978 | Genslak | |
| 4,239,023 A | 12/1980 | Simko | |
| 4,319,552 A | 3/1982 | Sauer et al. | |
| 4,338,897 A * | 7/1982 | Drumheller ......... | F02B 19/1004 123/267 |
| 4,864,989 A | 9/1989 | Markley | |
| 4,875,445 A * | 10/1989 | Imoto ..................... | F02B 19/18 123/292 |
| 4,892,070 A | 1/1990 | Kuhnert | |
| 5,791,374 A * | 8/1998 | Black .................. | F02B 19/1033 123/267 |
| 6,354,263 B2 * | 3/2002 | Ibrahim ................ | F02B 17/005 123/261 |
| 6,564,770 B1 | 5/2003 | Cathcart | |
| 7,069,901 B2 * | 7/2006 | Shiraishi ............... | F02B 17/005 123/261 |
| 7,082,920 B2 * | 8/2006 | Robinet .................. | F02B 19/12 123/260 |

(Continued)

FOREIGN PATENT DOCUMENTS

| | | |
|---|---|---|
| DE | 4 140 962 A1 | 1/1993 |
| FR | 2 986 564 A1 | 8/2013 |
| GB | 2 311 327 A | 9/1997 |

*Primary Examiner* — Erick R Solis
(74) *Attorney, Agent, or Firm* — Young & Thompson

(57) ABSTRACT

Disclosed is a valve ignition prechamber for an internal combustion engine which includes a combustion chamber in which a main load more or less diluted with a neutral gas is ignited, the prechamber including a lamination cavity into which an ignition unit opens and in which a lamination injector can inject under pressure an easily flammable pilot load, a lamination valve being able to close all or part of the lamination duct, in particular under the effect of the pressure of the gases prevailing in the combustion chamber.

14 Claims, 8 Drawing Sheets

(56) References Cited

U.S. PATENT DOCUMENTS

| | | | |
|---|---|---|---|
| 10,184,386 B2 * | 1/2019 | Jacob | ................ F02M 21/0242 |
| 2001/0050069 A1 | 12/2001 | Oprea et al. | |
| 2012/0103302 A1 | 5/2012 | Attard | |

* cited by examiner

VALVE IGNITION PRECHAMBER

BACKGROUND OF THE INVENTION

Field of the Invention

The subject matter of the present invention is a valve ignition prechamber which allows igniting a main load introduced into the combustion chamber of an internal combustion engine by means of a pilot load ignited by a spark, said prechamber being designed to optimize the efficiency of said pilot load to ignite said main load.

The maximum and average efficiency of reciprocating internal combustion engines according to the state of the art is relatively low. In automobiles, the maximum efficiency is of the order of thirty-five percent for Otto-cycle spark ignition engines, and of the order of forty percent in the case of Diesel cycle engines. With regard to the average efficiency in current use of automobile engines, it is most often less than twenty percent for spark ignition engines, and twenty-five percent for diesel engines.

In said engines, the fraction of the energy released by the combustion of the fuel and which is not converted into useful work is mainly dissipated in the form of heat in the cooling system and the exhaust of said engines.

In addition to poor efficiency, reciprocating internal combustion engines used in automobiles produce polluting gases and particles that are harmful to the environment and to health.

Description of the Related Art

Despite these disadvantageous characteristics, for lack of other solutions offering a better energy, environmental, functional, and economic compromise, Otto-cycle or Diesel internal combustion engines equip nearly all motor vehicles in circulation in the world.

This situation explains the significant research and development efforts made by the engine manufacturers to improve by all means the energy and environmental balance of internal combustion engines. These efforts are intended in particular to perfect the technologies that constitute the said engines, and to add to them new features that allow the implementation of new strategies.

BRIEF SUMMARY OF THE INVENTION

Among these strategies is the dilution of the air and fuel load of the reciprocating internal combustion engines either with a neutral gas or with fresh air rich in oxygen.

The present invention relates to this dilution and is particularly intended for reciprocating internal combustion engines with spark ignition that most often consume either gasoline or natural gas.

Diluting the load of spark ignition engines with fresh air or with previously cooled exhaust gases allows increasing the average and/or maximum thermodynamic efficiency of said engines. This results in reduced fuel consumption for the same useful work produced.

When the spark ignition engines operate at partial torque, introducing a diluted load into its(their) cylinder(s) produces less pumping losses than introducing an undiluted load. The reduction of said losses is due to the fact that the diluted load is larger with the same energy content. Thus, to introduce the same amount of energy in said cylinder(s), the throttling on admission of said engines usually made by means of a throttle valve is less pronounced, and the pressure of the gases that occur at said intake is higher. In addition, with the same energy introduced into the cylinder(s) of the spark ignition engines, diluting the load increases the mass and the total heat capacity of the latter. Thus, all things being otherwise equal, the combustion of said load is carried out at a lower temperature. In addition to reducing the amount of nitrogen oxides produced by the combustion, said low temperature reduces heat losses at the walls of the cylinder(s) resulting from the transfer by said load of a portion of its heat to said walls.

Finally, particularly if the load is diluted with a neutral gas that is poor in oxygen or even devoid of oxygen, said load is less sensitive to the uncontrolled self-ignition of the air-fuel mixture. Said self-ignition is responsible for the rattling, an undesirable phenomenon characterized by a detonating combustion that deteriorates the performance of the spark ignition engines and damages the mechanical components that constitute them. The desensitization to rattling provided by the dilution of the load allows said engines either to operate at a higher compression ratio, or to operate with ignition that is triggered at the most favorable time possible in terms of performance, or both.

In this particular context of diluted air and fuel loads, spark ignition engines operating with stoichiometry are distinct from said engines operating on excess air, also called "lean-burn".

The engines operating with stoichiometry are only compatible with a three-way catalyst, apparatus known per se that post-processes the pollutants resulting from combustion. Said catalyst is responsible for burning the hydrocarbons that have not been burned in the combustion chamber of the thermal engine. The products of this combustion are water vapor and carbon dioxide already present in the atmosphere. The said three-way catalyst also completes the oxidation of the notoriously polluting carbon monoxide to also convert it to carbon dioxide, and reduces the nitrogen oxides to transform them into the atmospheric dinitrogen which constitutes approximately seventy-eight percent of the terrestrial atmosphere, and which is by nature non-polluting.

The reduction of nitrogen oxides by the three-way catalysis requires that the load introduced into the engine be stoichiometric, that is to say that it contains the right amount of oxygen necessary for the combustion of the hydrocarbons contained in said load.

An excess of oxygen makes it impossible for the three-way catalyst to reduce the nitrogen oxides. It is therefore impossible to post-process the nitrogen oxides contained in the exhaust gases of engines operating with excess air by means of a three-way catalyst.

This explains why—in order to meet the ever more stringent environmental regulations—engines operating with excess air now receive a device specifically designed to reduce nitrogen oxides such as a nitrogen oxide trap or a device for the selective catalytic reduction of nitrogen oxides with urea. Said device is generally placed at the outlet of a two-way oxidation catalyst which has previously burned the unburned hydrocarbons and which has completed the oxidation of carbon monoxide, and more and more often, of a particulate filter.

Given that Diesel engines operate naturally with excess of air, since the entry into force of the Euro VI standard in Europe, almost all European diesel cars are equipped with a device that post-processes nitrogen oxides to transform them in dinitrogen.

The problem of these devices is that they are expensive, complex, and that their size and maintenance requirements are high to the point that said devices are almost exclusively used on diesel engines that can, in practice, operate only with excess air.

As far as spark ignition engines are concerned, engine manufacturers strive by all means to make them work with stoichiometry so that they remain compatible with three-way catalysts, which are, for that matter, simple and inexpensive.

To benefit from the reduction in fuel consumption induced by the dilution of the load of the spark ignition engines without having to suffer the particular economic drawbacks of a nitrogen oxide trap or device for the selective catalytic reduction of nitrogen oxides with urea, it is therefore necessary to dilute said load of said engines not with air rich in oxygen, but with a neutral gas devoid of oxygen.

This latter gas is usually obtained by recycling the exhaust gases of the engine itself, said gases no longer containing oxygen and being available and abundant. This strategy is known under the name of "Exhaust Gas Recirculation" or the acronym "EGR".

Said gases exiting at high temperature at the exhaust of the spark ignition engine, to prevent them from overheating the load introduced into said engine, it is necessary to reduce their temperature before mixing them with the fresh gases. This strategy is known as "Cooled EGR", which specifies that the recirculated exhaust gases are cooled prior to their mixing with the fresh gases received by said engine. The French engine manufacturers use the "Frenglish" term of "EGR refroidi", easily understandable and easy to use.

Prior cooling of the EGR gases is required for at least two purposes.

Firstly, it is necessary that the temperature of the EGR gases/fresh gases mixture received by the spark ignition engine remain low so that the volumetric efficiency of said engine remains high when operating at full torque. Indeed, for a given intake pressure, the mass of said mixture introduced into the cylinder(s) of said engine is all the more important that said mixture is cold. The pre-cooling of the EGR gases is made even more essential if said engine is supercharged by a turbocharger or by any other means.

Secondly, the hotter the EGR gases/fresh gases mixture, the more it leads to the occurrence of rattling which is detrimental to the performance of said engine.

The problem is that the load diluted with cooled EGR is poor in oxygen. This is paradoxical since it is also the goal sought in particular for the load to remain stoichiometric and resistant to rattling. The results of this oxygen depletion are that the initialization of the combustion is more difficult to achieve and that its development is slower than when said load is undiluted with cooled EGR.

In a spark ignition engine, the initialization of the combustion takes place by creating a high temperature electric arc between two electrodes distant from each other by a few tenths of a millimeter.

When the air-fuel load is heavily diluted with cooled EGR, the electric arc passes through a mixture globally poor in oxygen and fuel. The risk of a misfire increases if, by chance, the space of a few tenths of a millimeter between the cathode and the anode of the spark plug does not contain an EGR gases/fresh gases mixture sufficiently burnable because, indeed, heterogeneities are inevitably created in the three-dimensional space of the combustion chamber, with pockets richer in oxygen and/or fuel than others.

If the combustion is initialized as expected, the fuel energy contained in the load begins to release as heat and the flame begins to develop. To achieve this process, said flame communicates its heat in successive steps to the surrounding EGR gases/fresh gases mixture, burnable layer after burnable layer. Each layer is brought to its ignition temperature by the previous layer, burns, and releases heat that it communicates to the next layer and so on. According to the principle of the chain reaction, the flame propagates in the three-dimensional space of the combustion chamber of the spark ignition engine.

The main problem of cooled EGR is that it makes the initialization of combustion difficult, and then considerably slows the development of the latter both because of the overall reduction of its temperature, and because of the various degrees of richness of the combustive agent and/or fuel found within the volume of the combustion chamber and therefore, on the path of the flame.

Moreover, it is observed, experimentally, that the higher the content of the load in cooled EGR, the more unstable the engines becomes. From a certain given content, misfires occur and the efficiency—which until then had tended to increase with the cooled EGR content of the load—decreases. Beyond a certain content of said EGR, the spark ignition engine stops, the combustion being unable to initialize.

It is also observed that the unburned hydrocarbons and carbon monoxide content of exhaust gases increases in parallel with the cooled EGR content of the load. This is due to both pockets of mixture too poor to burn properly encountered by the flame on its path, and the thickening of the boundary layer flame jam near the cold internal walls of the combustion chamber of the engine.

Still experimentally, it is also observed that the higher the ignition power, the more it is possible to increase the cooled EGR content of the load without greatly altering the stability of the engine.

As such, many research laboratories—such as the South West Research Institute in the United States—have developed increasingly powerful electric ignition devices in order to push back the accessible limits of cooled EGR content of the load. The purpose of this strategy is, of course, to improve the efficiency of the spark ignition engine.

The problem of escalating the power of electric ignitions is that their performance decreases rapidly with their power. More and more electrical power is therefore needed to get less and less additional ignition power.

In addition, a high electrical power is of interest only if the electrodes of the spark plug are moved away from each other to give more chances to the spark to cross a burnable pocket, or if the duration of the spark is increased, or if the spark is repeated. This leads to increasingly high voltages and electrical powers which makes the realization of the electrical insulation of the spark plug more complex while drastically reducing the life of the latter.

The difficulty to ignite the load is also due to the fact that the cooled EGR is all the more interesting on turbocharged spark ignition engines when the aim is to reduce by all means their sensitivity to rattling. Yet, the higher the boost pressure, the greater the density of the EGR gases/fresh gases mixture between the electrodes of the spark plug at the moment of actuation of the spark, and the more voltage is required to cause the spark. On that basis, the cooled EGR does not go in the right direction because, with the same energy introduced into the cylinder of the engine, the mass of gas which is between the electrodes increases as well as the resistance of said gas to the ignition.

It is noted that patent No. FR 2 986 564 belonging to the applicant is a robust response to these problems. The spark ignition and high-pressure lamination device for an internal combustion engine referred to in said patent proposes to inject under high pressure, in the center of the spark plug and shortly before the spark is triggered, an approximately stoichiometric pilot load, highly burnable because undiluted with cooled EGR, and potentially slightly rich in fuel.

Once injected by said device, said load pilot bathing the electrodes of the spark plug, as soon as an electric arc is formed between said electrodes, said load ignites immediately and releases the energy it contains. Thus, said load itself is the means of ignition in itself whose power is several hundred to several thousand times greater than that of the electric arc that allowed to ignite it. It is practically impossible to obtain such ignition power with electric means alone.

Indeed, experience has shown that cooled EGR rates of approximately fifty percent are possible with such a device compared with approximately only thirty percent simply with the most powerful electric ignition devices.

It will be noted that the approach adopted in the patent No. FR 2 986 564 is found in related forms in U.S. Pat. No. 4,319,552 of the inventors Fred N. Sauer and J. Brian Barry, or in the patent No. DE 41 40 962 A1 belonging to the Bosch Company.

In any case, the patent No. U.S. Pat. No. 6,564,770 of the Orbital Company does not fall into this category because the object of this patent is to ensure the constitution of a main load as homogeneous as possible at relatively low pressure and is not to form a pilot load for ignition purposes of a main load highly diluted with EGR.

The problem of the device described by the patent No. FR 2 986 564, and in related patents as they have just been mentioned, is not in the initialization of the combustion which is very efficient, but in the development of said combustion. In particular, when the burned fraction of the fuel contained in the main load reaches about fifty percent, the combustion struggles to progress so that the total time required to burn all of the main load is greater than the time required to burn all of a main load undiluted with cooled EGR.

As a result, part of the potential energy gain of the cooled EGR is lost due to a combustion that develops too slowly.

However, the maximum benefit of the cooled EGR would be found if it were possible to operate a spark ignition engine simultaneously, on the one hand, with a main load whose cooled EGR content would be of the order of fifty percent and, on the other hand, with a stability and a total duration of combustion comparable to those found on the same said engine when the latter burns an undiluted load.

The solution could come from the use of a prechamber in which the pilot load would be introduced, said prechamber being able to house the electrodes of the spark plug and, even, to form an integral part of said spark plug, as proposed in U.S. Pat. No. 4,319,552.

The first advantage of such a prechamber is that it potentially maintains the pilot load as close as possible to the electrodes of the spark plug, which can limit the dispersion of said load in the main combustion chamber of the spark ignition engine before the ignition of said load.

The second advantage of said prechamber is that, once ignited, the pilot load pressurizes said prechamber which sends hot gas torches at high speed into the main combustion chamber of the spark ignition engine via holes that are included in said prechamber.

This ignition of the main load by means of torches is very effective because, instead of starting from the center of the combustion chamber as is the case with an ordinary spark plug ignition, the flame is initialized in multiple places of the combustion chamber, and develops radially from the periphery of the chamber towards the center of the chamber, and tangentially between each torch.

The energy of the fuel is thus released in a very short time, which is favorable to the thermodynamic efficiency of the spark ignition engine because, not only the triggering is more productive in terms of useful work, but because the slightest sensitivity to rattling that results from a such a rapid combustion allows operating the engine with a significantly higher volumetric ratio.

In any event, the U.S. Pat. No. 4,319,552, or the solution proposed in patent FR 2,986,564 belonging to the applicant or in the related patents previously mentioned, cannot be compared to the multitude of patents which involve injecting fuel alone into a prechamber or not, and not a mixture of air and fuel.

Among these patents, mention will be made, for example, of those known under No. GB 2 311 327 A from <<Fluid Research Limited>>, U.S. Pat. No. 4,864,989 from <<Tice Technology Corp>>, U.S. Pat. No. 4,124,000 from General Motors, U.S. Pat. No. 4,239,023 from <<Ford Motor Company>>, U.S. Pat. No. 4,892,070 from the inventor Dieter Kuhnert, US Pat. No. 2001/0050069 A1 from the inventors Radu Oprea and Edward Rakosi, or US Pat. No. 2012/0103302 A1 from the inventor William Attard, on the principle of which the ignition system called "Turbulent Jet Ignition" was developed by the German company <<Mahle>> for Formula 1 engines.

There is indeed a fundamental difference between the solutions set out in these patents, which are related to "lean burn" spark ignition engines and whose only purpose is to enrich the fuel load around the point of ignition on the grounds that the load as a whole is low in fuel but rich in oxygen, and the solutions set out in patent FR 2 986 564 and related patents which mainly propose spark ignition engines operating with a load highly diluted with cooled EGR and which aim to constitute a mixture rich in fuel AND oxygen around the ignition point, on the grounds that the load as a whole is low in fuel AND in oxygen.

At this stage, it has been seen that injecting a highly burnable pilot load consisting of air and fuel to envelop the electrodes of the spark plug with said load, as proposed in patent No. FR 2 986 564, allows to effectively ignite a main load strongly diluted with EGR.

It has also been seen that once said main load is ignited, the combustion progresses rapidly until about fifty percent of the total quantity of fuel contained in the said load is burned. Beyond the said fifty percent, the combustion develops more slowly, so that from a certain EGR content of the main load, the thermodynamic efficiency of the spark ignition engine decreases instead of increasing as expected.

It was assumed that if—as proposed in U.S. Pat. No. 4,319,552—the pilot load was injected into a prechamber in which the electrodes of the spark plug were housed, the latter problem of combustion development beyond fifty percent would be solved in whole or in part.

Indeed, said prechamber would eject through its holes torches of hot gas animated with a high speed that would both initialize the combustion over a great radial length around the ignition point, but also, would crease the flame front which would promote the development of the flame perpendicular to the said torches.

However, this last solution may prove unsatisfactory for a lot of reasons, some of which led to the abandonment of ignition devices based on a prechamber, particularly in the context of spark ignition engines.

Indeed, to be effective, the prechamber must have a protruding dome which penetrates sufficiently into the combustion chamber of the engine so that the holes, exposed by said dome and through which the hot gases are ejected to form torches, are positioned sufficiently inside said chamber so that said torches do not lick the cold internal walls of said engine.

However, as soon as the combustion is initialized in the prechamber, the gases contained in the latter rise rapidly in pressure and are ejected at high speed through said holes. In doing so, said gases heat said dome.

Once the combustion of the main load has been initialized, the pressure prevailing in the combustion chamber of the engine rapidly exceeds that prevailing in the prechamber so that hot gases pass through the holes of the dome in the opposite direction, heating the latter again.

During the expansion of the gases by the piston of the spark ignition engine, the pressure prevailing in said prechamber becomes greater than that prevailing in the combustion chamber of the engine. As a result, the hot gases contained in the prechamber pass a third time through said holes, further overheating said dome.

However, from a certain temperature, the protruding dome behaves like a "hot ball" like the ignition system of the internal combustion engine invented by Stuart Herbert-Akroyd and described in the patent CHD4226 of Dec. 4, 1891. Such a hot spot then potentially leads to inadvertent non-spark-controlled ignitions of the main load. The rattling that may follow is likely to damage or even destroy the spark ignition engine.

A solution may be to extensively cool said dome to prevent it from becoming a hot spot. However, the resulting heat export occurs at the expense, on the one hand, of the efficiency of the hot gas torches whose temperature and speed are reduced during their passage through the holes in said dome and, on the other hand, of the thermodynamic efficiency of the spark ignition engine.

It is therefore imperative that the prechamber be unable to behave like a "hot-ball" ignition device, as previously mentioned, or, at least, that the initialization of the combustion of the main load be reliably triggered at the chosen time, and not happen at an uncontrolled time.

This involves cooling the hot parts of said prechamber capable of triggering a self-ignition, but this must be done without greatly diminishing the effectiveness of said prechamber to diffuse hot gas torches in the three-dimensional space of the combustion chamber of the engine that contains the main load.

In addition, it is noted that the constitution of an air-fuel pilot load brought to high-pressure is not free in terms of energy. It is necessary to first compress air, which requires a compressor driven by the spark ignition engine itself, and then inject fuel into said air. Another strategy may consist in directly compressing an air-fuel mixture previously constituted.

Thus, because of its non-negligible energy cost, with the same ignition efficiency, the smaller are the mass and the pressure of the pilot load compared to that of the main load, the better is the final energy balance of the spark ignition engine when operating under high EGR rates. Therefore, in order to ignite the load, it is necessary to give the pilot load, by all possible means, the highest possible specific efficiency relative to the mass and pressure of said pilot load.

In other words, with the same ignition efficiency, the pilot load must contain the smallest amount of air-fuel mixture possible, previously put under the lowest pressure possible.

As such, it is necessary to avoid as much as possible that the pilot load be dispersed in the main load before its ignition because such a dispersion reduces the specific efficiency of the pilot load to ignite the main load and can only be offset by increasing the mass of said pilot load, which is be done at the expense of the fuel efficiency of the spark ignition engine.

The dispersion results in particular from the time needed by the injector which introduces the pilot load into the prechamber to perform the injection of said pilot load under a pressure necessarily greater than that of the main load.

It should also be noted that the injection pressure of the pilot load remains approximately constant while the pressure of the main load increases under the effect of its compression following the rising of the piston of the spark ignition engine towards its Top Dead Center. The beginning of the injection of the pilot load therefore takes place under a differential pressure greater than the end of said injection. As a result, the speed of ejection of the constituent gases of the pilot load by the injector is greater at the beginning of the injection than at the end of the injection.

Before the injection of the pilot load, the pressure in the prechamber is lower than that prevailing in the compression chamber of the engine. Part of the main load therefore enters first in said prechamber as the said load is being compressed.

Then, the injector injects the pilot load into the prechamber where it mixes with the fraction of the main load which has a high EGR content and which was previously introduced into said prechamber.

The excess gas mass due to said fraction is then expelled out of the prechamber with a portion of the pilot load, which is mixed with high EGR content gases in and out of the prechamber.

The flammability of the mixture thus constituted of air, fuel and EGR is therefore necessarily heterogeneous in the volume of the prechamber and out of the prechamber. The effectiveness of the pilot load to ignite as quickly as possible is thus reduced as is the efficiency of the hot gas torches to ignite the main load.

This decrease in efficiency can only be offset by an increase in the air and fuel mass of the pilot load, which takes place at the expense of the overall energy efficiency of the spark ignition engine.

Ideally, it should therefore be avoided by any possible means to disperse the pilot load in the main load before the ignition of said pilot load.

This does not call in any way into question the fact that it would be very advantageous to improve the device described by the patent No. FR 2 986 564. Indeed, said device was effective in initializing the combustion at very high levels of cooled EGR and in developing said combustion until a fraction of about fifty percent of the fuel contained in the main load was burned.

The objective would be to give the device the ability to develop said combustion very quickly until a fraction of at least ninety or one hundred percent of said fuel is burned.

As previously mentioned, this could be achieved by means of a prechamber as suggested by U.S. Pat. No. 4,319,552, but provided that it is possible to circumvent the notorious, possibly crippling, defects of such a said prechamber. To this end, it is necessary to significantly improve the effectiveness of said prechamber, which includes avoiding that it behave like a "hot ball", preventing the pilot load from being dispersed in the main chamber, and limiting the amount of energy required to compress said pilot load, while maintaining the same ignition efficiency.

All of these objectives are addressed by the valve ignition prechamber according to the invention which—according to a particular embodiment—allows:

greatly reducing the thermal load to which the protruding dome exposed by the prechamber is subjected, achieved by dividing by approximately three the number of passages of the hot gases through the holes in said dome and through which said gases are ejected, so as to prevent the said dome from being brought to an excessive temperature and from becoming a hot spot likely to cause an inadvertent self-ignition of the main load;

minimizing the mass and the pressure of the pilot load necessary not only for the initialization of the combustion of main loads strongly diluted with EGR, but also for the rapid development of the said combustion until all of the said main loads are burned;

to achieve this last objective, avoiding the dispersion of the pilot load in the main load during the injection of said pilot load in the prechamber.

To achieve all of these objectives, the valve ignition prechamber according to the invention allows:

maintaining the prechamber closed when the pressure prevailing therein is lower than that prevailing in the combustion chamber in order to avoid unwanted back and forth of the hot gases through the holes provided in the protruding dome and through which said prechamber communicates with said chamber;

keeping the prechamber closed during most of the injection time of the pilot load so that the said injection takes place in an enclosed space in which the gases of the said pilot load cannot mix with the gases of the main load;

lowering the mass and injection pressure of the pilot load while maintaining the high pressure and ejection speed of the hot gases through the holes in the protruding dome.

The valve ignition prechamber is designed to be inexpensive to mass produce in order to remain compatible with the economic constraints of most applications for which it is intended, including automobiles.

It is understood that the valve ignition prechamber according to the invention can be applied to any spark ignition rotary or linear internal combustion engine, whatever the type, whatever the fuel, gaseous, liquid or solid that it consumes and whose main load is diluted with cooled EGR or not, with a neutral gas of any nature whatsoever, or with a gas rich in oxygen or any other combustive agent.

It is also understood that the pilot load that is received by the valve ignition prechamber according to the invention may contain a fuel and/or a combustive agent different from the fuel and/or combustive agent which constitutes the main load of the spark ignition engine.

The other features of the present invention have been described in the description and in the secondary claims, dependent directly or indirectly from the main claim.

The ignition prechamber valve according to the present invention is provided for an internal combustion engine which comprises a cylinder head which caps a cylinder to form a combustion chamber in which a main load can be burned, said prechamber comprising:

at least one stratification cavity which, on the one hand, is arranged in the cylinder head and is connected to the combustion chamber by a lamination duct and which, on the other hand, receives a lamination injector which can, directly or indirectly, inject into said cavity a pilot load previously pressurized by compression means, said load consisting of a combustive agent/AF fuel mixture easily flammable by means of a spark;

ignition means that open into the lamination cavity and can ignite the pilot load;

a lamination valve which can close all or part of the lamination duct and which exposes, on the one hand, a cavity side face subjected to the pressure of the gases prevailing in the lamination cavity and, on the other hand, a chamber side face subjected to the pressure of the gases prevailing in the combustion chamber, said lamination valve being able to translate with respect to said duct under the effect of the gas pressure, either towards the lamination cavity when said pressure prevailing in the latter is lower than the pressure prevailing in the combustion chamber, or towards said chamber when the pressure in the latter is lower than the pressure in the lamination cavity;

at least one cavity side valve stop that determines the position of the lamination valve closest to the lamination cavity;

at least one chamber side valve stop that determines the position of the lamination valve closest to the combustion chamber.

The valve ignition prechamber according to the present invention comprises a lamination valve which closes all or part of the lamination duct when it is closest to the lamination cavity while it opens said duct on a wider section when it is positioned closest to the combustion chamber.

The valve ignition prechamber according to the present invention comprises a cavity side valve stop which consists of a valve closing seat arranged in the lamination duct or at either end of said duct, said seat cooperating with a cavity side valve bearing surface located at the periphery and/or at the end of the lamination valve.

The valve ignition prechamber according to the present invention comprises a valve closure seat and a cavity side valve seat which create a seal when they are in contact with each other, said seal preventing any gas from passing at said contact when the pressure prevailing in the combustion chamber is greater than the pressure prevailing in the lamination cavity.

The valve ignition prechamber according to the present invention comprises a chamber side valve stop which consists of a valve opening seat arranged in the lamination duct or at either end of said duct, said seat cooperating with a chamber side valve bearing surface located at the periphery and/or at the end of the lamination valve.

The valve ignition prechamber according to the present invention comprises a valve opening seat and a chamber side valve seat which create a seal when they are in contact with each other so as to prevent any gas from passing at said contact.

The valve ignition prechamber according to the present invention comprises a lamination valve which comprises at its periphery guiding means which maintain said valve approximately centered in the lamination duct, and approximately in the same longitudinal orientation as said duct, whatever the axial position of said valve with respect to said duct.

The valve ignition prechamber according to the present invention provides that, when the valve opening seat and the chamber side valve bearing surface are in contact with each other, the lamination valve forms with the lamination duct a torch ignition prechamber which communicates simultaneously with the lamination cavity, on the one hand, and with the combustion chamber via at least one gas ejection hole, on the other hand.

The valve ignition prechamber according to the present invention comprises an internal peripheral wall of the torch ignition prechamber which is cylindrical, while the lamination valve has a circular periphery and is housed at low radial clearance in said prechamber.

The valve ignition prechamber according to the present invention comprises a lamination duct which opens projecting into the combustion chamber in the form of a protruding ejection dome which houses the torch ignition prechamber and from which the gas ejection hole opens.

The valve ignition prechamber according to the present invention comprises a valve opening seat which is arranged in the protruding ejection dome.

The valve ignition prechamber according to the present invention provides that when the lamination valve is positioned close to the combustion chamber, that is to say in the vicinity or even in contact with the chamber side valve stop with which it cooperates, said valve uncovers at least one gas ejection hole which connects the lamination cavity with the combustion chamber.

The valve ignition prechamber according to the present invention comprises ignition means which consist of an ignition spark plug which closes the first end of a perforated connecting tube which traverses all or part of the internal volume of the lamination cavity and whose body is radially traversed by at least one radial slot which connects the inside of said tube with said internal volume, while the second end of said tube receives the lamination duct and the lamination valve, and while the central electrode and the ground electrode of said spark plug are housed inside the perforated connecting tube.

The valve ignition prechamber according to the present invention comprises a cavity side face which exposes an aerodynamic dome.

The valve ignition prechamber according to the present invention comprises a cavity side face which forms a ground electrode which faces a central electrode included in an ignition spark plug, the latter constituting the ignition means.

The valve ignition prechamber according to the present invention comprises a lamination valve which is axially thicker at its periphery, which receives the cavity side valve bearing surface and the chamber side valve bearing surface, than at its center.

BRIEF DESCRIPTION OF THE DRAWINGS

The description that follows with reference to the accompanying drawings, given by way of non-limiting example, will help to better understand the invention, its features and the benefits it is likely to provide.

DESCRIPTION OF THE INVENTION

FIGS. 1 to 12 show the valve ignition prechamber 1, various details of its components, its variants, and its accessories.

Figure 1:
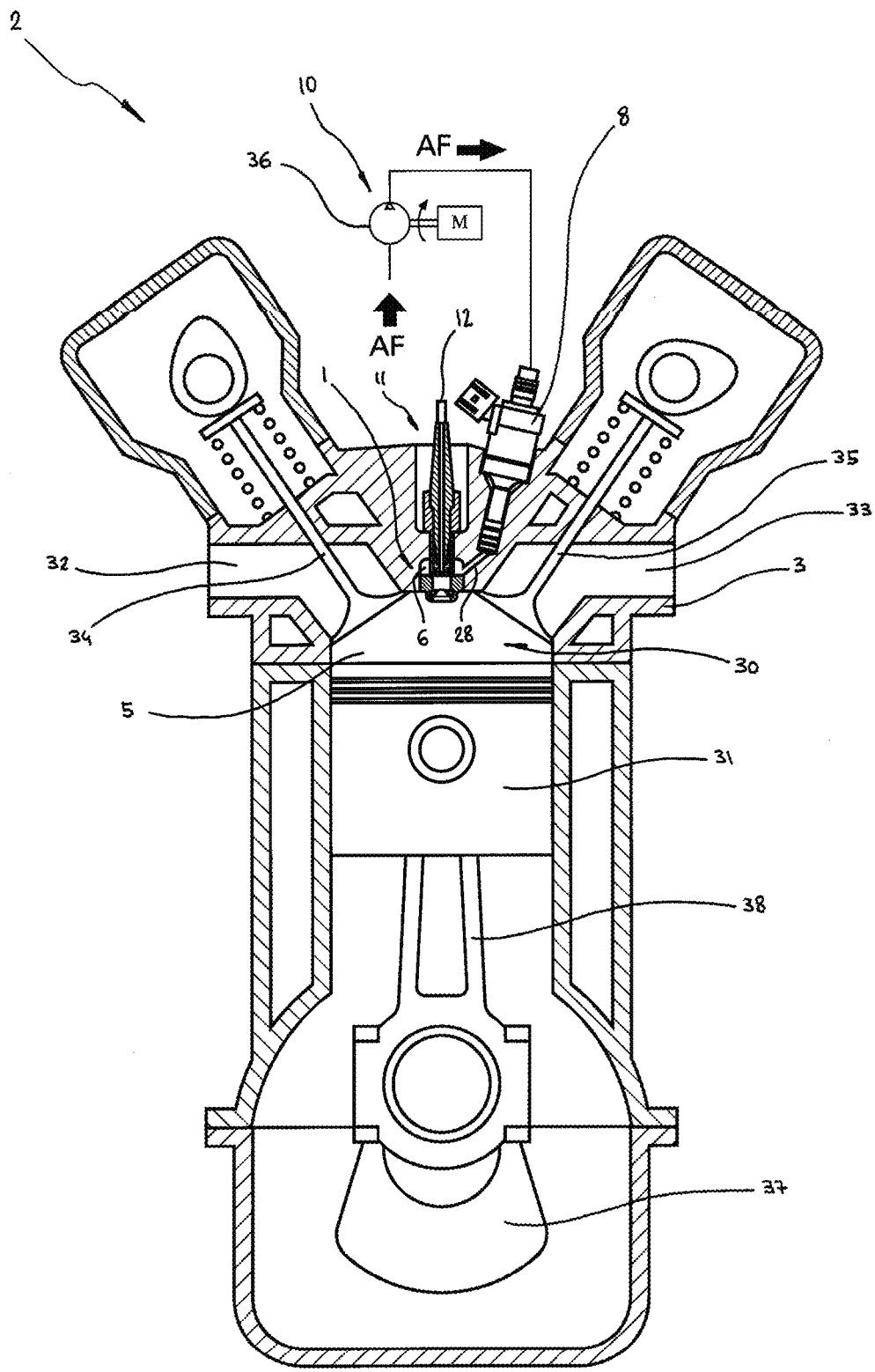
FIG. 1 is a schematic sectional view of the valve ignition prechamber according to the invention as it can be installed in the cylinder head of an internal combustion engine.

It was seen in FIG. 1 that the valve ignition prechamber 1 is specially designed for an internal combustion engine 2 which comprises a cylinder head 3 which caps a cylinder 4 to form with a piston 31 a combustion chamber 5 in which a main load 30 can be burned.

It will be noted in FIGS. 1 to 12 that the valve ignition prechamber 1 according to the invention comprises at least one lamination cavity 6 which, on the one hand, is arranged in the cylinder head 3 and is connected to the combustion chamber 5 by a lamination duct 7 and which, on the other hand, receives a lamination injector 8 which can directly or indirectly inject into said cavity 6 a pilot load 9 previously compressed by compression means 10.

According to the invention, the pilot load 9 consists of a combustive agent-AF fuel mixture easily flammable by means of a spark.

Figure 2:
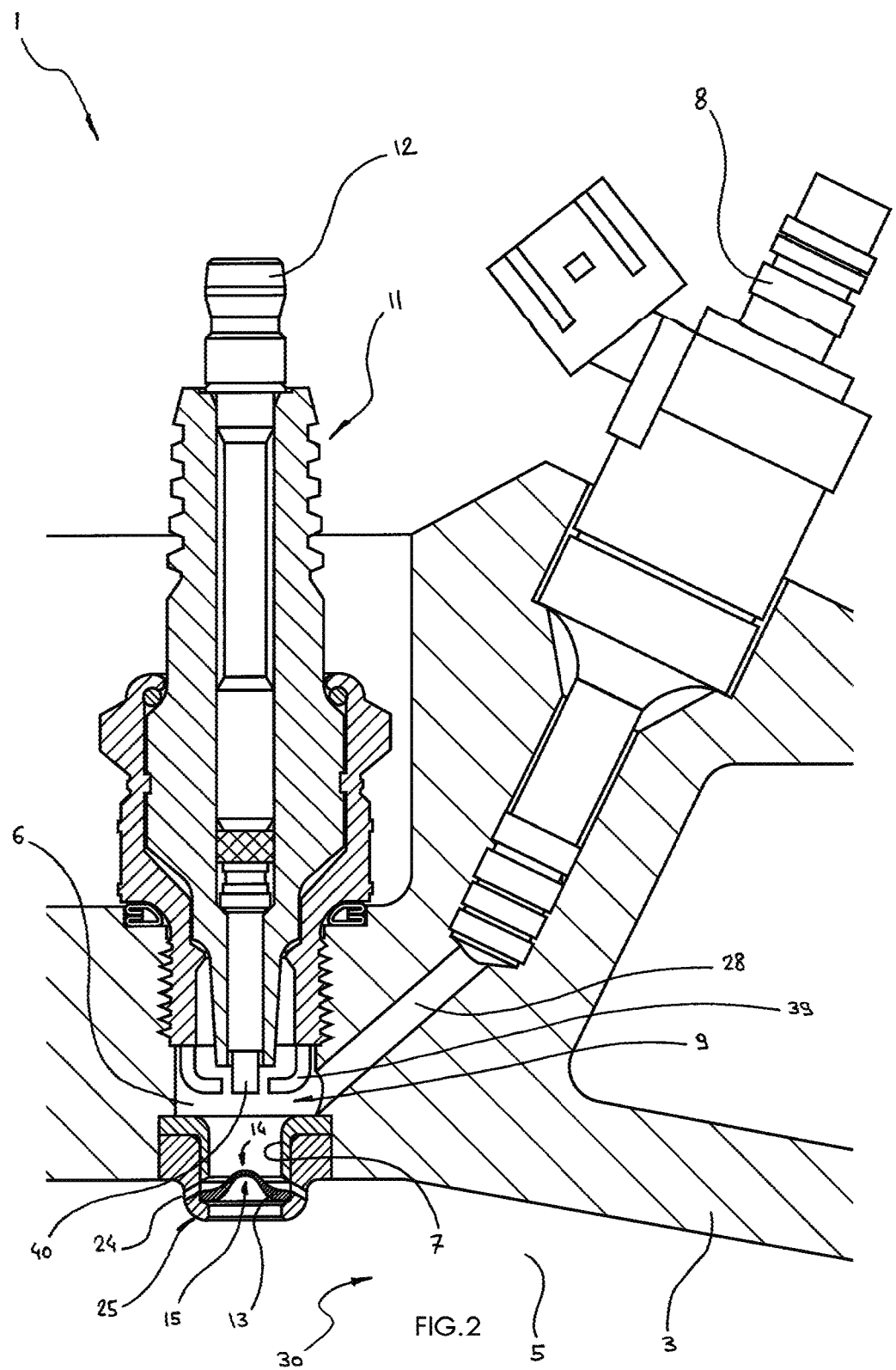
FIG. 2 is a schematic sectional view of the valve ignition prechamber according to the invention, whose lamination valve can completely close the lamination duct when the cavity side valve bearing surface included in said lamination valve is in contact with the valve closing seat with which it cooperates, while said lamination valve forms a torch ignition prechamber which is housed in a protruding ejection dome when said valve rests on its chamber side valve stop.
Figure 9:
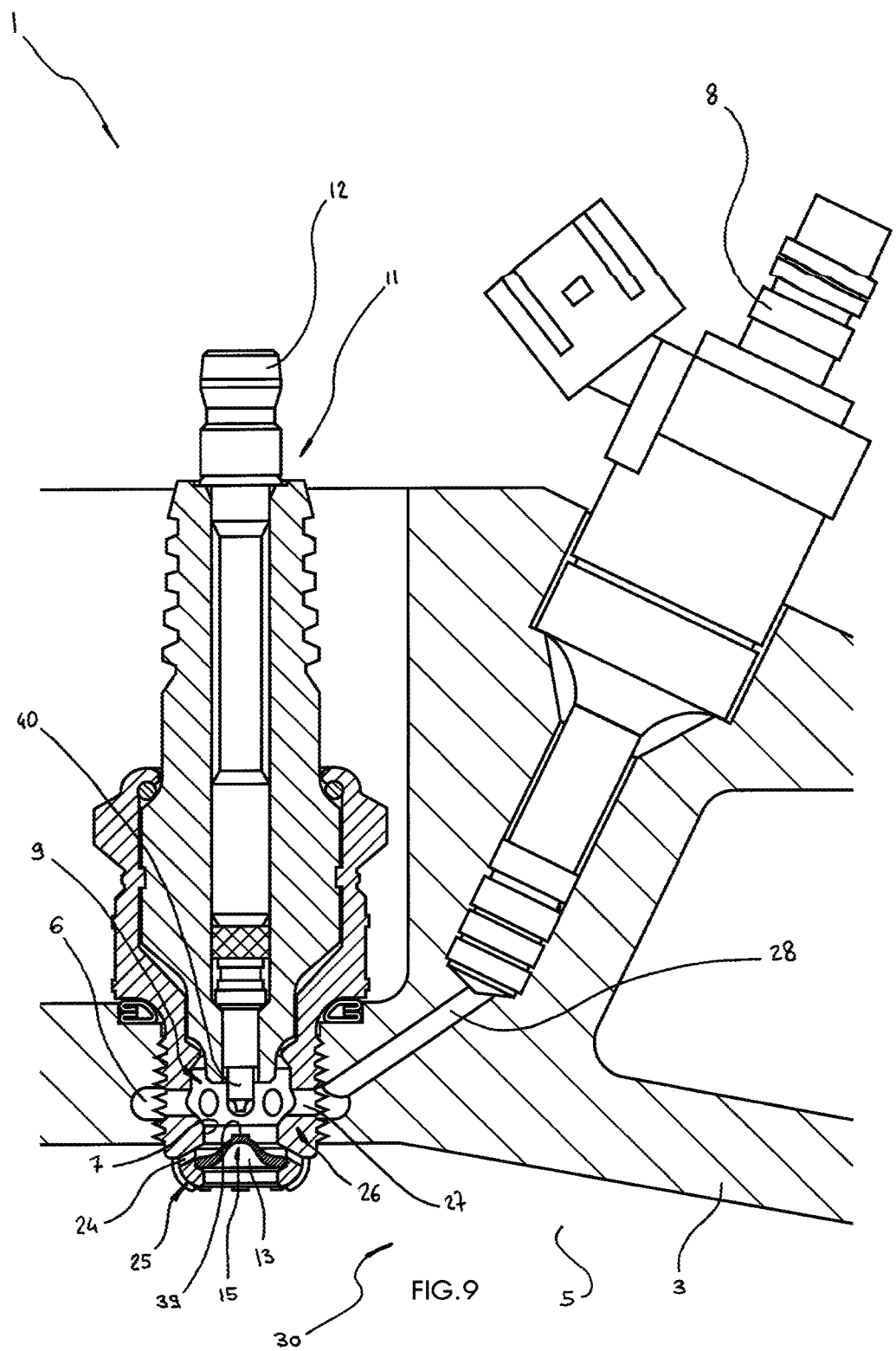
FIG. 9 is a schematic sectional view of the valve ignition prechamber according to the invention incorporating the main features shown in FIG. 2 to which is added a radially perforated connecting tube traversed by radial slot, said tube passing through the internal volume of the lamination cavity and being integral with an ignition spark plug, while the cavity side face of the lamination valve forms a ground electrode which faces a central electrode included in said spark plug.
Figure 10:
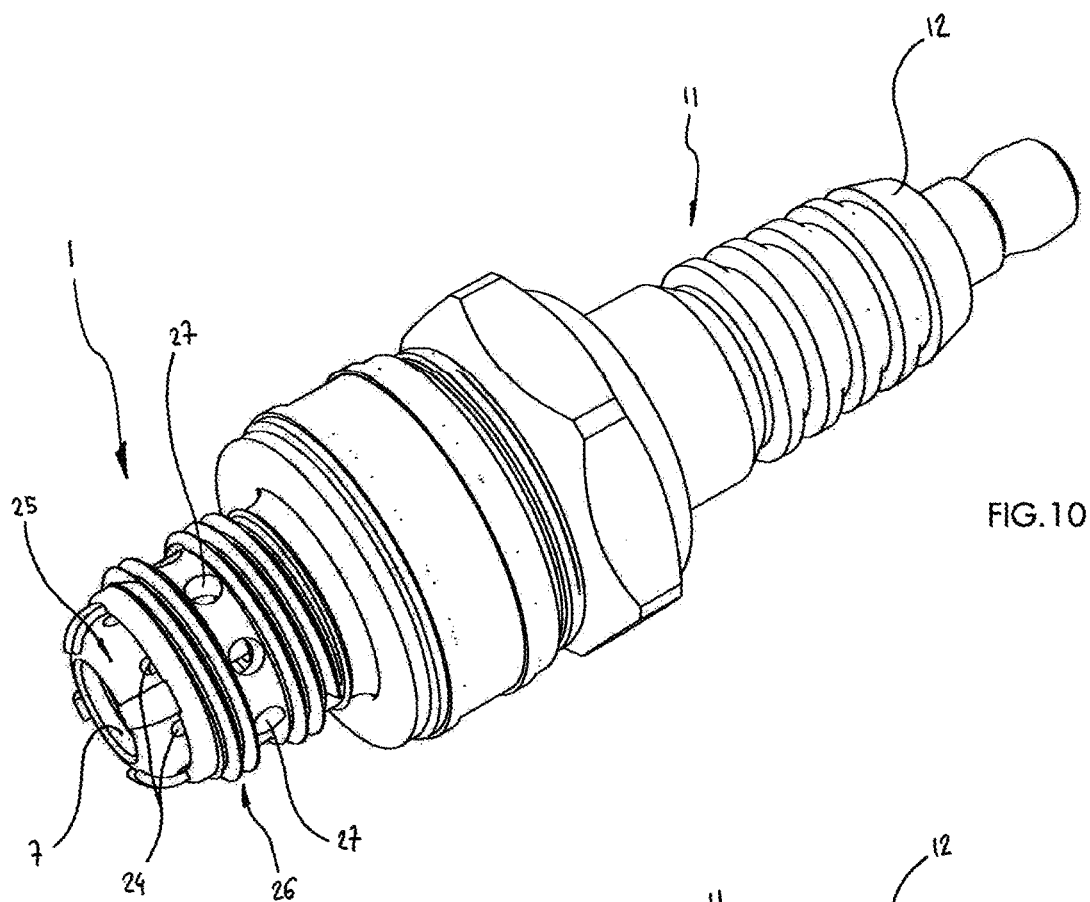
FIG. 10 is a three-dimensional view of the valve ignition prechamber according to the invention and according to the embodiment shown in FIG. 9.
Figure 11:
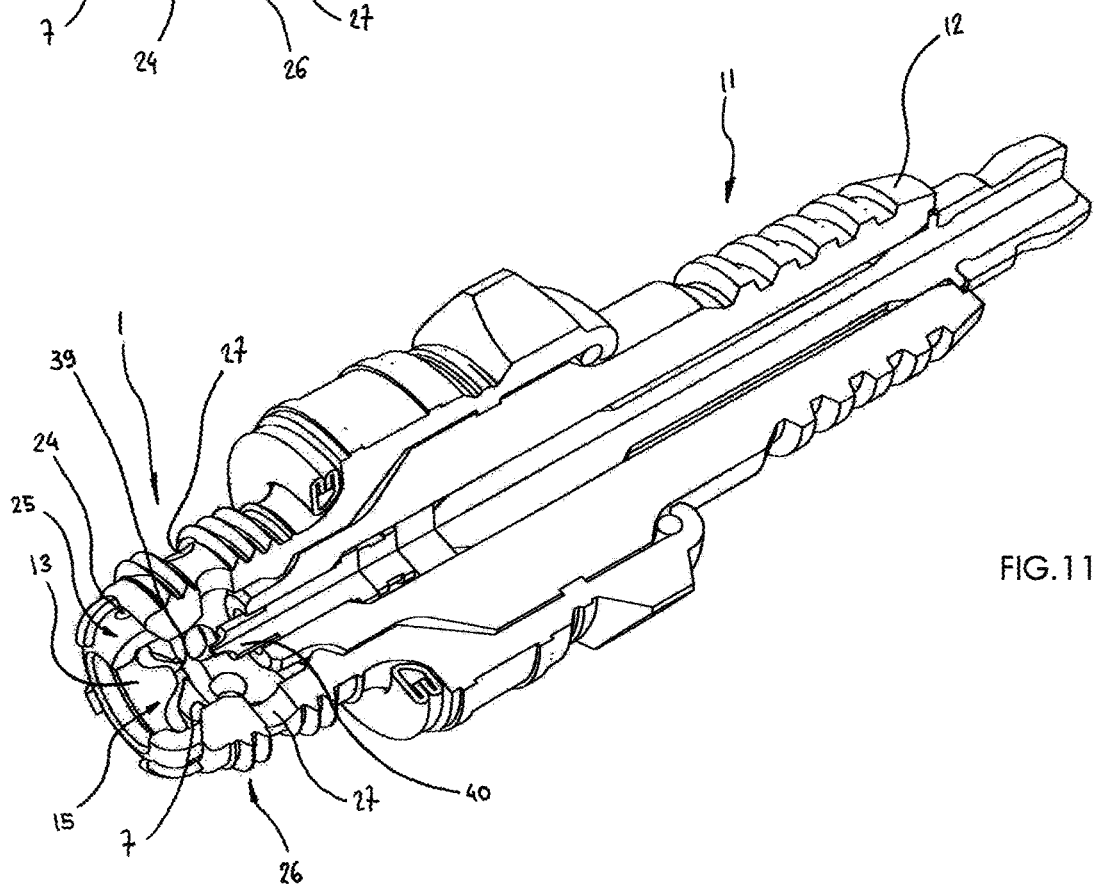
FIG. 11 is a three-dimensional view in broken longitudinal section of the valve ignition prechamber according to the invention and according to the variant embodiment shown in FIG. 9.
Figure 12:
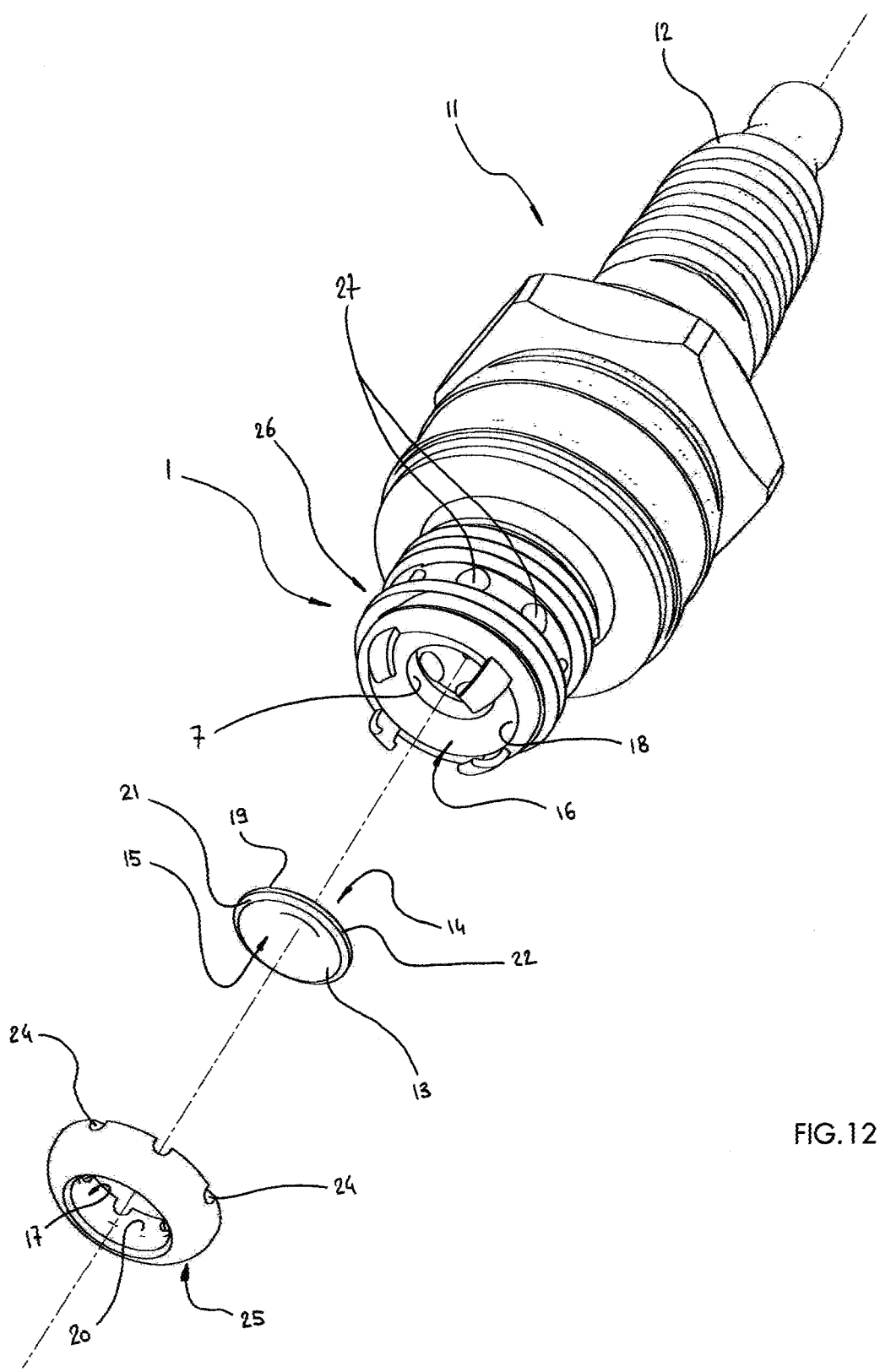
FIG. 12 is an exploded three-dimensional view of the valve ignition prechamber according to the invention and according to the alternative embodiment shown in FIG. 9.

FIGS. 1, 2 and 9 show the lamination injector 8 included in the valve ignition prechamber 1 according to the invention and which can, directly or indirectly, via an injector outlet duct 28, inject the pilot load 9 into the lamination cavity 6.

The lamination injector 8 may be of any type, without restriction, and may consist of any device capable of introducing a pilot load 9 into the lamination cavity 6 by means of any operating procedure whatsoever, whether the combustive agent-AF fuel mixture contained in said load 9 is formed upstream or downstream of said lamination injector 8 with the possible assistance of another injector of either gas or liquid, or with the assistance of a carburetor known per se.

In addition, the lamination cavity 6 and the lamination duct 7 may advantageously be coated with a refractory material known per se, or be made of said material. Alternatively, an air gap may be left between at least a portion of the lamination cavity 6 and/or the lamination duct 7, on the one hand, and the cylinder head 3 which receives these components 6, 7, on the other hand, so as to limit heat exchanges between said components 6, 7 and said cylinder head 3.

It can also be seen in FIGS. 1 to 12 that the valve ignition prechamber 1 according to the invention comprises ignition means 11 which open into the lamination cavity 6 and which can ignite the pilot load 9, said means 11 possibly consisting of an ignition spark plug 12 known per se.

It is also noted in FIGS. 1 to 12 that the valve ignition prechamber 1 according to the invention comprises a lamination valve 13 which can close all or part of the lamination duct 7 and which exposes, on the one hand, a cavity side face 14 subjected to the pressure of the gases prevailing in the lamination cavity 6 and, on the other hand, a chamber side face 15 subjected to the pressure of the gases prevailing in the combustion chamber 11.

It should be noted that said lamination valve 13 can translate with respect to the lamination duct 7 under the effect of the pressure of the gases, either towards the lamination cavity 6 when said pressure in the latter is lower than the pressure prevailing in the combustion chamber 5, or towards said chamber 5 when the pressure prevailing therein is lower than the pressure prevailing in the lamination cavity 6.

It will be noted that the lamination valve 13 can also move in the lamination duct 7 under the effect of gravity or acceleration, which cannot be interpreted as any advantage or a desired mode of operation.

It can be emphasized that the lamination valve 13 can be made of a temperature-resistant superalloy and remain as light as possible, or ceramic material such as silicon carbide.

In addition to what has just been described, it will be noted that the valve ignition prechamber 1 according to the invention comprises at least one cavity side valve stop 16 which determines the position of the lamination valve 13 closest to the lamination cavity 6. This is particularly visible in FIGS. 3 to 8.

In addition, the valve ignition prechamber 1 according to the invention comprises at least one chamber side valve stop 17 which determines the position of the lamination valve 13 closest to the combustion chamber 5.

As a variant of the valve ignition prechamber 1 according to the invention, it will be noted that the lamination valve 13 may close all or part of the lamination duct 7 when it is closest to the lamination cavity 6 while it opens said duct 7 over a wider section when it is positioned closest to the combustion chamber 5.

In FIGS. 3 to 8 in particular, it will be noted that the cavity side valve stop 16 may consist of a valve closing seat 18 provided in the lamination duct 7 or at either end of said duct 7, said seat 18 cooperating with a cavity side valve bearing surface 19 located at the periphery and/or at the end of the lamination valve 13.

It should also be noted that the valve closing seat 18 and the cavity side valve bearing surface 19 may create a seal when they are in contact with each other, said seal preventing any gas from passing at said contact when the pressure prevailing in the combustion chamber 5 is greater than the pressure prevailing in the lamination cavity 6.

As another variant, the chamber side valve stop 17 may consist of a valve opening seat 20 provided in the lamination duct 7 or at either end of said duct 7, said seat 32 cooperating with a chamber side valve bearing surface 21 located at the periphery and/or at the end of the lamination valve 13.

In this case, the valve opening seat 20 and the chamber side valve bearing surface 21 can create a seal when they are in contact with each other so as to prevent any gas from passing at said contact.

FIGS. 3 to 8 and FIG. 12 clearly show that the lamination valve 13 may comprise in its periphery guide means 22 which hold said valve 13 approximately centered in the lamination duct 7, and approximately in the same longitudinal orientation as said duct 7, regardless of the axial position of said valve 13 with respect to said duct 7.

In FIGS. 2, 3, 6, 8 and 9, it will be noted that when the valve opening seat 20 and the chamber side valve bearing surface 21 are in contact with each other, the lamination valve 13 can form with the lamination duct 7 a torch ignition prechamber 23 which simultaneously communicates, on the one hand, with the lamination cavity 6 and, on the other hand, with the combustion chamber 5 via at least one gas ejection hole 24.

In this particular context of the ignition prechamber valve 1 according to the invention, the internal peripheral wall of the torch ignition prechamber 23 may be cylindrical while the lamination valve 13 has a circular periphery and is housed with low radial clearance in said prechamber 23 so that a small radial clearance is left between said valve 13 and said wall regardless of the position of said valve 13 with respect to said prechamber 23, said small clearance forming a restricted passage which slows down the passage of gases between the lamination cavity 6 and the combustion chamber 5.

FIGS. 1 to 12 show that, according to a particular embodiment of the valve ignition prechamber 1 according to the invention, the lamination duct 7 can open and project into the combustion chamber 5 in the form of a protruding ejection dome 25 which houses the torch ignition prechamber 23 and from which the gas ejection hole 24 opens.

It is noted that the gas ejection hole 24 may be more or less oriented towards the combustion chamber 5 and exit more or less tangentially at the periphery of the protruding ejection dome 25. In addition, the geometry of the gas ejection hole 24 may vary depending on whether the jet of gas exiting said orifice 24 is designed to be rather directional, or rather diffuse. As an example, the gas ejection hole 24 may be cylindrical, conical, or form a convergent or a divergent.

Advantageously, and as shown in FIGS. 1 to 12, the valve opening seat 20 may be arranged in the protruding ejection dome 25, the latter may be coated with an antifriction and/or non-stick and/or refractory material known per se, or be made of said material.

In a general sense, it is understood that when the lamination valve 13 is positioned close to the combustion chamber 5, that is to say in the vicinity or even in contact with the chamber side valve stop 17 with which it cooperates, said valve 13 can uncover at least one gas ejection hole 24 which connects the lamination cavity 6 with the combustion chamber 5.

As shown in FIGS. 9 to 12, the ignition means 11 may consist of a spark plug 12 which closes the first end of a perforated connecting tube 26 which passes through all or part of the internal volume of the lamination cavity 6 and whose body is radially traversed by at least one radial slot 27 which connects the interior of said tube 26 with said internal volume, while the second end of said tube 26 receives the lamination duct 7 and the lamination valve 13, and while the central electrode 40 and the ground electrode 39 of said spark plug 12 are housed inside the perforated connecting tube 26.

It should be noted in FIGS. 9 to 12 that the perforated connecting tube 26 may be part of the spark plug 12 whose seat it extends. In this case, the spark plug 12 is directly screwed into the cylinder head 3 by means of a threading formed on the external cylindrical face of its seat and/or on the external cylindrical face of the perforated connecting tube 26 which extends it.

Alternatively, the spark plug 12 may be screwed into said tube 26 while the latter is screwed into the cylinder head 3. In all cases, a seal is created between the cylinder head 3, on the one hand, and the spark plug 12 and/or the perforated connecting tube 26, on the other hand, both at said spark plug 12 and at the lamination duct 7.

FIGS. 9 to 12 show that the cavity side face 14 can expose an aerodynamic dome 29 which allows, in particular, to direct the flow of gas towards the gas ejection hole(s) 24 by offering the least possible resistance to said flow and generating the least possible turbulences in said flow.

FIGS. 1 to 12 show that, according to a particular embodiment of the valve ignition pre-chamber 1 according to the invention, the cavity side face 14 can form a ground electrode 39 which faces a central electrode 40 comprised in a spark plug 12, the latter constituting the ignition means 11, an electric arc being able to be formed between said ground electrode 39 and said central electrode 40 when a high-voltage current passes from said central electrode 40 to said ground electrode 39.

FIGS. 1 to 12 further illustrate that the lamination valve 13 may be axially thicker at its periphery, which receives the cavity side valve bearing surface 19 and the chamber side valve bearing surface 21, than at its center.

This characteristic gives said valve 13 a radial thickness which gradually increases from the center of said valve 13 towards its periphery so that said valve 13 is both the lightest possible and the most resistant possible to shocks, while ensuring its cooling as effectively as possible at the contact between its valve bearing surfaces 19, 21 and the seats 18, 20 with which said bearing surfaces 19, 21 cooperate.

OPERATING MODE OF THE INVENTION

The operating mode of the valve ignition prechamber 1 according to the invention is easily understood when looking at FIGS. 1 to 12.

It can be seen that according to the nonlimiting example of application of the valve ignition prechamber 1 according to the invention shown in FIG. 1, said prechamber 1 is implemented in an internal combustion engine 2 which comprises a cylinder head 3 which caps a cylinder 4 to form with a piston 31 a combustion chamber 5 in which a main load 30 can be burned.

It should be noted that the piston 31 is connected to a crankshaft 37 via a connecting rod 38, said piston 31 giving said crankshaft 37 a rotational movement when said piston 31 is driven by an alternating translational movement in the cylinder 4.

FIG. 1 also shows that the combustion chamber 5 may be placed in communication with an intake duct 32 via an intake valve 34 while said chamber 5 may be put in communication with an exhaust duct 33 by means of an exhaust valve 35.

FIGS. 1 to 8, which will be taken here as an example for illustrating the operating mode of the valve ignition prechamber 1 according to the invention, show that said prechamber 1 is integrated in the cylinder head 3. Said FIGS. 1 to 8 also show that the ignition means 11 consist here of a spark plug 12 known per se whose electrodes open into the lamination cavity 6. The lamination injector 8, which can inject a pilot load 9 in the lamination cavity 6 via an injector outlet duct 28, is also seen in FIGS. 1 and 2.

It will be noted in FIG. 1 that, prior to its injection by the lamination injector 8, the pilot load 9 consisting of an easily flammable combustive agent-AF fuel mixture has been pressurized by a lamination compressor 36 which forms the compression means 10. This is also a non-limiting example of embodiment of the valve ignition prechamber 1 according to the invention, taken here by way of example to illustrate the operating mode.

To illustrate the operating mode of the valve ignition prechamber 1 according to the invention, it will be assumed here that the volumetric ratio of the internal combustion engine 2—excluding volume of the valve ignition prechamber 1—is fourteen to one. To obtain this result, a volume of five hundred cubic centimeters swept by the piston 31 is provided while the volume of the combustion chamber 5 is thirty-eight decimal five cubic centimeters.

In addition, and by way of non-limiting example, the volume of the ignition valve prechamber 1—including the volume of the lamination duct 7 and that of the injector outlet duct 28—is here half a cubic centimeter.

The exemplary embodiment shown in FIGS. 1 to 8 will be used here to describe in detail the operating mode of the valve ignition prechamber 1 according to the invention, in which it is found that the cavity side valve stop 16 consists of a valve closing seat 18 arranged in the lamination duct 7, said seat 18 cooperating with a cavity side valve bearing surface 19 located at the periphery of the lamination valve 13.

It was chosen here that the valve closing seat 18 and the cavity side valve bearing surface 19 create a seal when they are in contact with each other, said seal preventing any gas from passing at said contact when the pressure prevailing in the combustion chamber 5 is greater than the pressure prevailing in the lamination cavity 6.

It will also be noted that, to illustrate the operating mode of the valve ignition prechamber 1 according to the invention, it was also provided that the chamber side valve stop 17 consist of a valve opening seat 20 arranged in the lamination duct 7, said seat 32 cooperating with a chamber side valve bearing surface 21 located at the periphery of the lamination valve 13. This particular configuration is clearly visible in FIGS. 3 to 8.

In this particular context, it will be provided that the valve opening seat 20 and the chamber side valve bearing surface 21 create a seal when they are in contact with each other so as to prevent any gas from passing at said contact.

Particularly in FIGS. 2, 3, 6 and 8, it will also be noted that when the valve opening seat 20 and the chamber side valve bearing surface 21 are in contact with each other, the lamination valve 13 forms with the lamination duct 7 a torch ignition prechamber 23 of annular shape, said prechamber 23 simultaneously communicating, on the one hand, with the lamination cavity 6 and, on the other hand, with the combustion chamber 5 via several gas ejection holes 24.

It should also be noted that the internal peripheral wall of the torch ignition prechamber 23 is cylindrical while the lamination valve 13 has a circular periphery and is housed at low radial clearance in said prechamber 23 so that a small radial clearance is left between said valve 13 and said wall regardless of the position of said valve 13 with respect to said prechamber 23, said small clearance forming a restricted passage which slows down any passage of gas—via said small clearance—between the lamination cavity 6 and the combustion chamber 5.

It is also noted in FIGS. 1 to 8 that the lamination duct 7 opens projecting into the combustion chamber 5 in the form of a protruding ejection dome 25 which houses the torch ignition chamber 23 and from which open the gas ejection holes 24 which, according to this example, are oriented towards the combustion chamber 5. It will be noted in passing that the valve opening seat 20 is arranged in the protruding ejection dome 25.

Incidentally, it can be seen in FIGS. 1 to 8 that the cavity side face 14 of the lamination valve 13 exposes an aerodynamic dome 29 which, in particular, allows directing the flow of gas towards the gas ejection holes 24 by offering the least possible resistance to said flow and generating the least possible turbulences in said flow.

It is also noted that the lamination valve 13 is axially thicker at its periphery than at its center. This feature allows said valve 13 to be both the lightest possible and the most resistant possible to shocks, while ensuring its cooling as effectively as possible at the contact between its valve bearing surfaces 19, 21 and the seats 18, 20 with which said bearing surfaces 19, 21 cooperate. As a non-limiting example, the lamination valve 13 can be made in a mechanically and thermally highly resistant superalloy.

As per the embodiment of the valve ignition prechamber 1 according to the invention shown in FIGS. 1 to 8 and taken here as an illustration of the operating mode of said prechamber 1, it will be assumed that the diameter of the gas ejection holes 24 measures twelve hundredths of a millimeter while the maximum total stroke that the lamination valve 13 can travel between the valve closing seat 18 and the valve opening seat 20 measures fifteen hundredths of a millimeter.

To understand the operating mode of the valve ignition prechamber 1 according to the invention, it is useful here to decompose its operation into the four stages of the internal combustion engine 2, in connection with FIGS. 3 to 8.

It will be considered that the internal combustion engine 2 operates with an approximately stoichiometric air-gasoline main load 30 strongly diluted by cooled recirculated exhaust gases known as "cooled EGR". Said load 30 is therefore resistant to ignition and is in no way conducive to rapid development of its combustion in the three-dimensional space of the combustion chamber 5.

As such, it is expected that the pilot load 9, which will be implemented by the valve ignition prechamber 1 according to the invention, must have the greatest efficiency possible not only to initialize the combustion of the main load 30, but also to develop said combustion in the shortest possible time. It is understood that these two objectives are directly served by the valve ignition prechamber 1 according to the invention.

According to the non-limiting embodiment of the valve ignition prechamber 1 according to the invention, taken here to illustrate its operating mode, it will be assumed that the pilot load 9 contains one comma six percent of the fuel contained in the main load 30, said pilot load 9 consisting of a combustive agent-AF fuel mixture that is highly flammable by means of a spark.

The four-stroke cycle designed/conceived by Otto/Beau de Rochas will be decomposed here according to the usual sequencing.

In the intake phase, the piston 31 of the internal combustion engine 2 goes down into the cylinder 4 with which it cooperates, which results in introducing into the latter a main load 30 coming from the intake duct 32 and through the intake valve 34 kept open.

Figure 3:
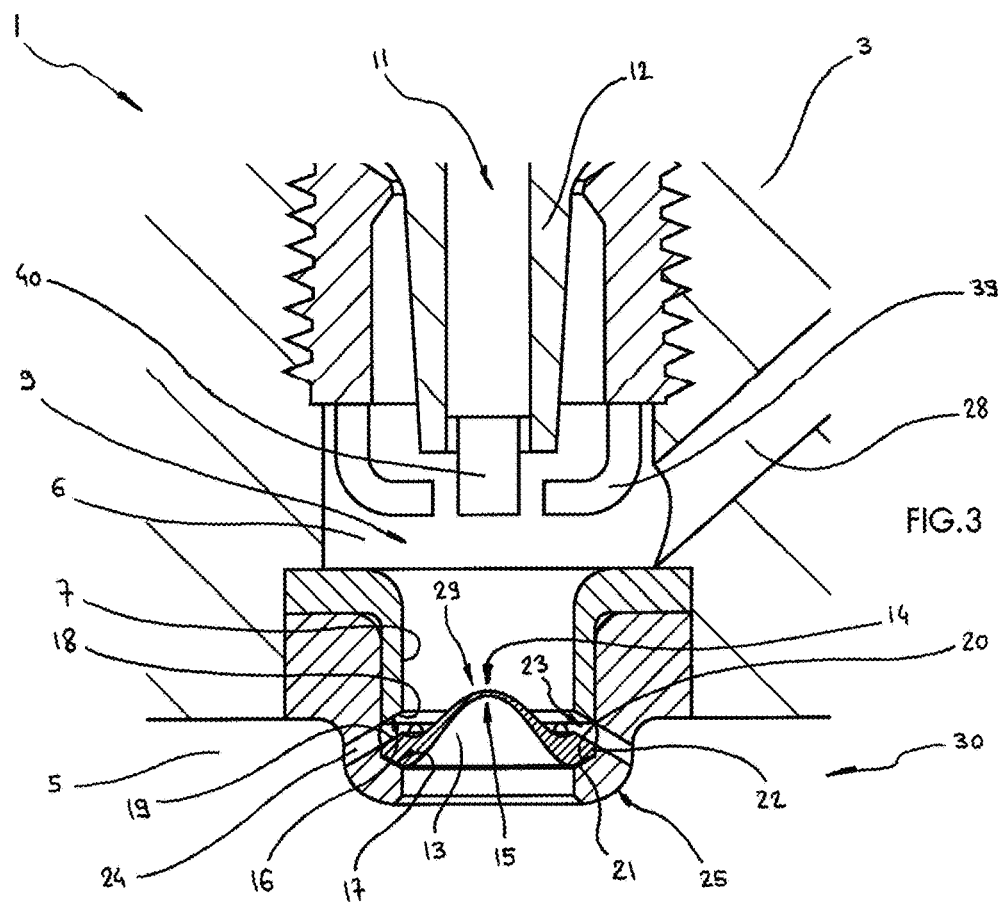
FIGS. 3 to 8 are partial close-up views in schematic section of the valve ignition prechamber according to the invention and according to the particular configuration shown in FIG. 2, said close-up views illustrating various phases of operation of said prechamber.
Figure 4:
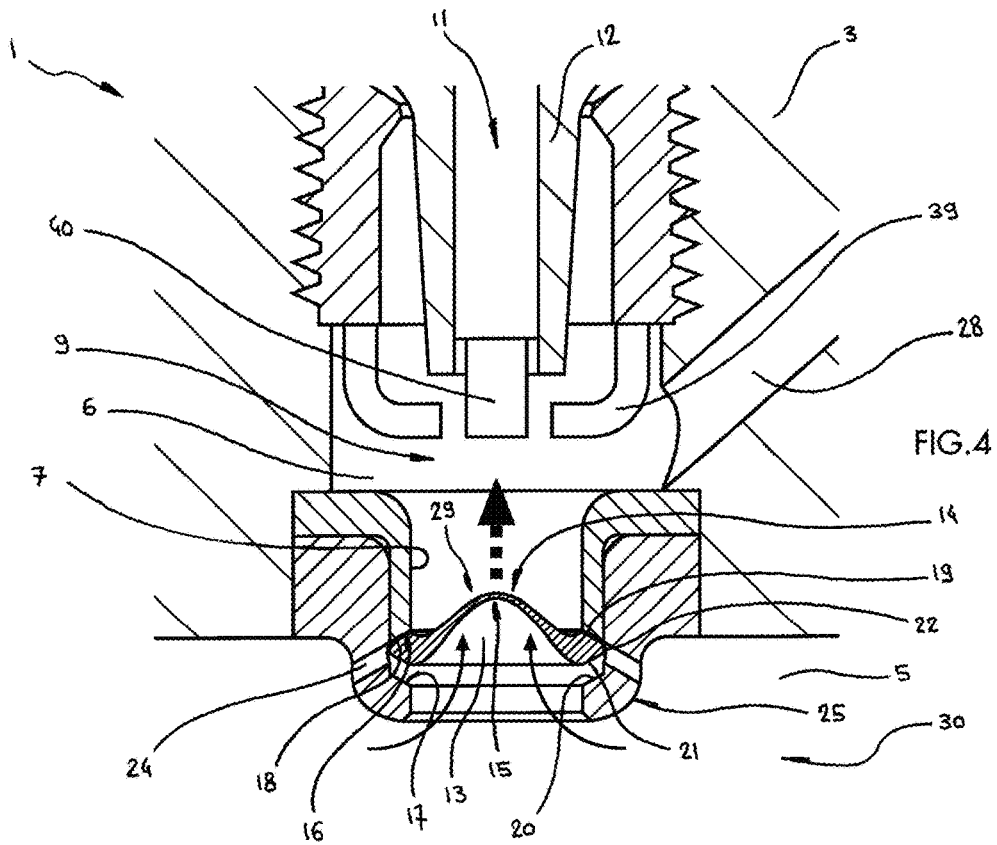

During said phase, the pressure prevailing in the combustion chamber 5 is lower than the pressure prevailing in the lamination cavity 6. As a result, and as shown in FIG. 3, the lamination valve 13 remains pressed against the valve opening seat 20 with which it cooperates and the lamination cavity 6 is put in communication with the combustion chamber 5 by the gas ejection holes 24 via the torch ignition prechamber 23.

The piston 31 having reached its Bottom Dead Center, the inlet valve 34 closes and the piston 31 begins its ascent in the cylinder 4, to its Top Dead Center.

In doing so, said piston 31 compresses the main load 30 and the pressure prevailing in the combustion chamber 5 becomes higher than that prevailing in the lamination cavity 6.

The pressure difference between said chamber 5 and said cavity 6 increases all the more rapidly as, on the one hand, the section of the gas ejection holes 24 is small and as, on the other hand, a small radial clearance is left between the lamination valve 13 and the internal wall of the torch ignition prechamber 23, regardless of the position of said valve 13 with respect to said prechamber 23.

To go from the combustion chamber 5 to the lamination cavity 6, the constituent gases of the main load 30 have virtually no other passage than the gas ejection holes 24.

Since the latter leave only a limited passage section to said gases, the difference between the pressure exerted on the cavity side face 14 and that exerted on the chamber side face 15 increases, which has the effect of pressing the lamination valve 13 against the valve closing seat 18 with which it cooperates. This situation is clearly illustrated in FIG. 4.

It will be noted that the time required for the lamination valve 13 to, on the one hand, break the contact it forms with the valve opening seat 20 with which it cooperates and, on the other hand, to make contact with the valve closing seat 18, corresponds to a few degrees of rotation of the crankshaft 37 or even to only one or two degrees of said rotation, these values being given for information only.

In doing so, the lamination valve 13 closes the lamination duct 7 and the combustion chamber 5 no longer communicates with the lamination cavity 6. The pressure which continues to increase in the combustion chamber 5 due to the rise of the piston 31 in the cylinder 4 has no longer any effect on the pressure prevailing in the lamination cavity 6, said pressure remaining stable.

Figure 5:
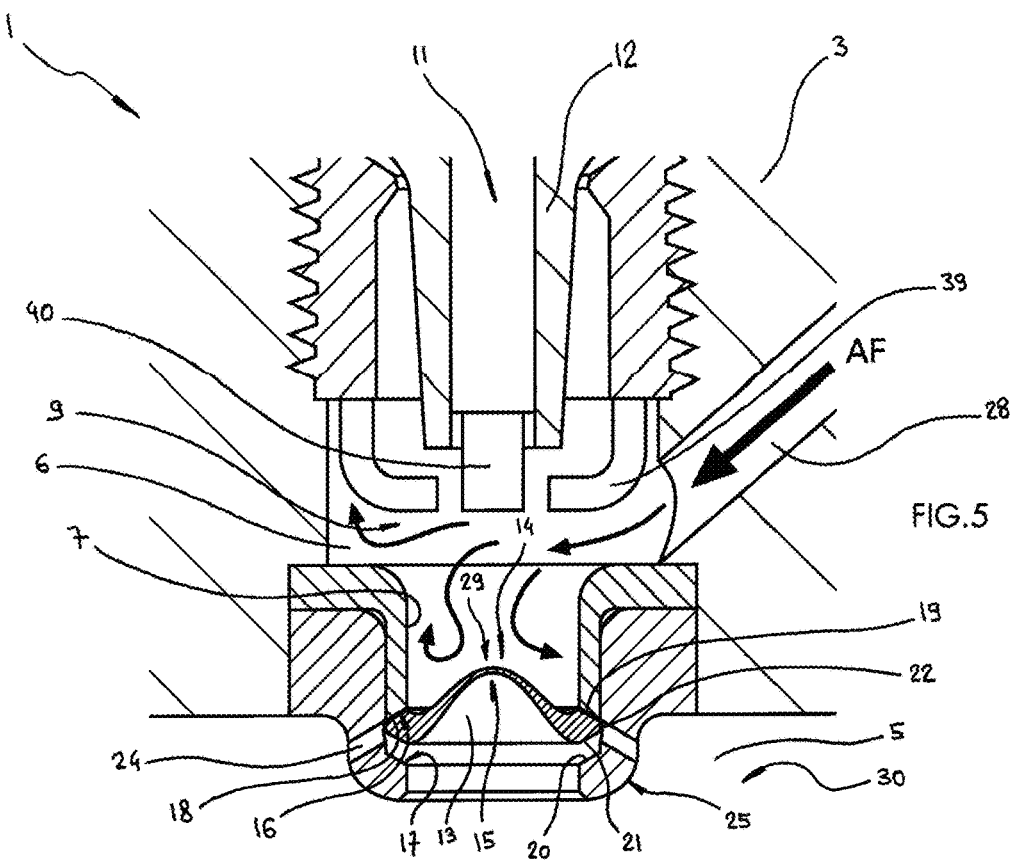

A few degrees of crankshaft after the lamination valve 13 has closed the lamination duct 7, the lamination injector 8 begins to inject the pilot load 9 into the lamination cavity 6. This situation is illustrated in FIG. 5. The temperature of the constituent gases said load 9 is according to this example of the order of eighty degrees.

A few degrees of crankshaft after the lamination valve 13 has closed the lamination duct 7, the lamination injector 8 begins to inject the pilot load 9 into the lamination cavity 6. This situation is illustrated in FIG. 5. The temperature of the constituent gases of said load 9 is, according to this example, of the order of eighty degrees.

The flow rate of the injector was calculated so that the pressure prevailing in the lamination cavity 6 remains always lower than that which prevails in the combustion chamber 5 so that the lamination valve 13 never detaches from the valve closing seat 18 with which it cooperates via its cavity side valve bearing surface 19.

A few degrees of crankshaft 37 before the Top Dead Center of the piston 31, the pressure prevailing in the combustion chamber 5 and to which the main load 30 is subjected has reached nearly forty bars while the pressure in the lamination cavity 6 has reached twenty bars. The lamination injector 8 stops injecting the pilot load 9 into the lamination cavity 6.

Figure 6:
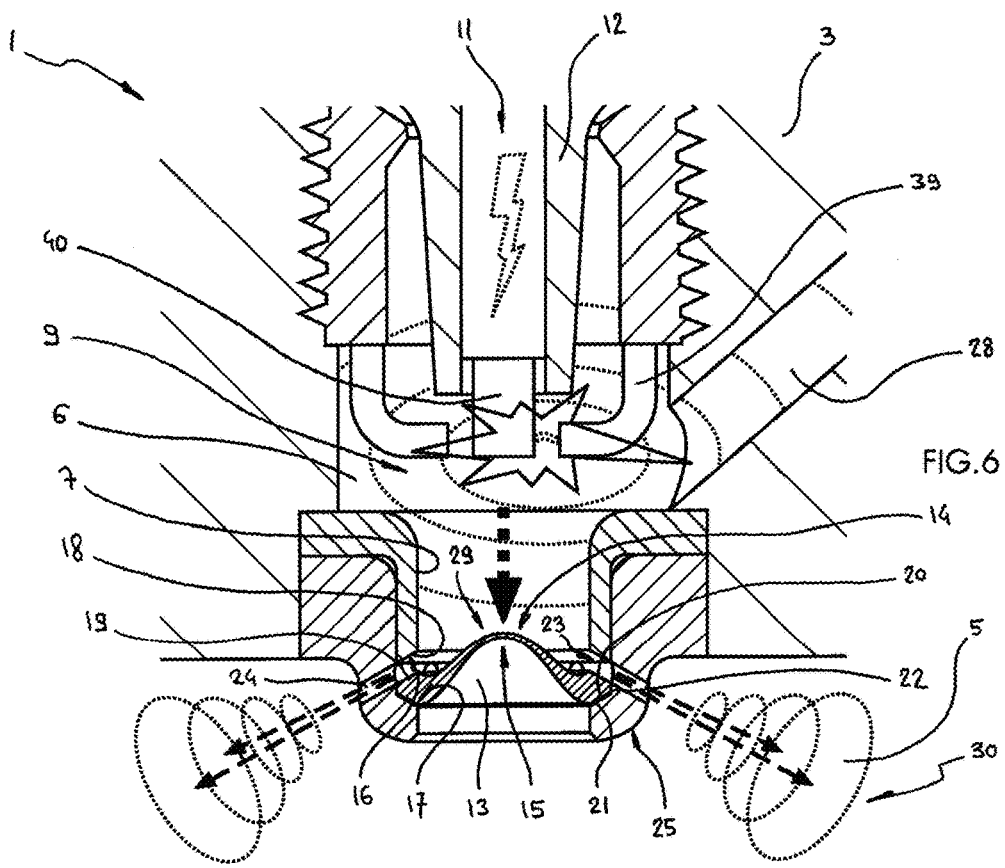

As shown in FIG. 6, when the piston 31 arrives in the vicinity of its Top Dead Center, a high-voltage current is applied to the terminal ends of the spark plug 12. The latter ignites the pilot load 9 held in the lamination cavity 6.

It will be noted moreover that the pressure of only twenty bars prevailing in said cavity 6 allowed to apply only a moderate voltage to the terminal ends of the spark plug 12.

As shown in FIG. 6, the pilot load 9 consisting of an easily flammable combustive agent-AF fuel mixture, the flame initialized by the spark plug 12 propagates very rapidly in the pilot load 9 whose temperature increases just as rapidly, as is the pressure prevailing in the lamination cavity 6.

When said pressure reaches, for example, forty-five bars—that is to say five bars more than the pressure that prevails in the combustion chamber 5—the lamination valve 13 has already traveled fifteen hundredths of a millimeter. In doing so, said valve 13 has detached from its contact with the valve closing seat 18 and has come to rest on the valve opening seat 20. This situation is also shown in FIG. 6.

During its course, the lamination valve 13 gradually uncovered the gas ejection holes 24 and the hot gases—which have been, for example, brought to a temperature of about two thousand degrees Celsius—started to be ejected from the lamination cavity 6 in the form of torches through said orifices 24, via the torch ignition prechamber 23 and at the protruding ejection dome 25. This effect provided by the valve ignition prechamber 1 according to the invention is shown in FIG. 6.

As the pressure continues to rise in the lamination cavity 6, the pressure in said cavity 6 is now twenty bars higher than that prevailing in the combustion chamber 5. As a result, the pressure of the hot gases drops by 20 bars during their passage through the gas ejection holes 24 so that their temperature falls to around one thousand three hundred degrees. In return, said gases are made to move at high speed which allows them to penetrate deeply into the volume of the combustion chamber 5.

In doing so, said hot gases ignite the surrounding gases constituting the main load 30. In addition to releasing into heat the fuel energy that they contain, said surrounding gases are made to move at a high local speed by said hot gases, said speed materializing in the form of micro turbulences. The folding of the flame front resulting from said micro turbulences promotes the development of combustion, which propagates rapidly to the entire main load 30 and in the entire volume of the combustion chamber 5.

It will be noted that the efficiency of the valve ignition prechamber 1 according to the invention to develop said combustion is all the greater as the hot gas torches formed all around the protruding ejection dome 25 ignite the main load 30 in multiple places in the combustion chamber 5.

Indeed, once initialized radially from the center to the periphery of the combustion chamber 5, the combustion of said load 30 develops in a second phase radially from the periphery of said chamber 5 towards the center of said chamber 5, and tangentially between each hot gas torch coming out of the protruding ejection dome 25 via the gas ejection holes 24.

Once the combustive agent-AF fuel mixture which constitutes the pilot load 9 is completely burned and largely ejected in the form of hot gas jets via the gas ejection holes 24, combustion develops in the combustion chamber 5 and the pressure prevailing in the latter quickly becomes greater than that prevailing in the lamination cavity 6.

Also, as soon as this situation is reached, the chamber side face 15 of the lamination valve 13 receives a pressure greater than that which is exerted on the cavity side face 14 of said valve 13. It follows that the lamination valve 13 moves rapidly over fifteen hundredths of a millimeter towards the lamination cavity 6, and is pressed tightly against the valve closing seat 18 with which it cooperates. This situation is illustrated in FIG. 7.

The combustion of the main load 30 occurring very rapidly despite the high content of "cooled EGR" of said load 30, said combustion is completed only a few degrees of crankshaft 37 after the piston 31 reaches the Top Dead Center. The thermodynamic efficiency of the internal combustion engine 2 will thus be able to reach its maximum level because the expansion has barely begun while all the energy contained in the constituent fuel of the main load 30 has already been released.

Figure 7:
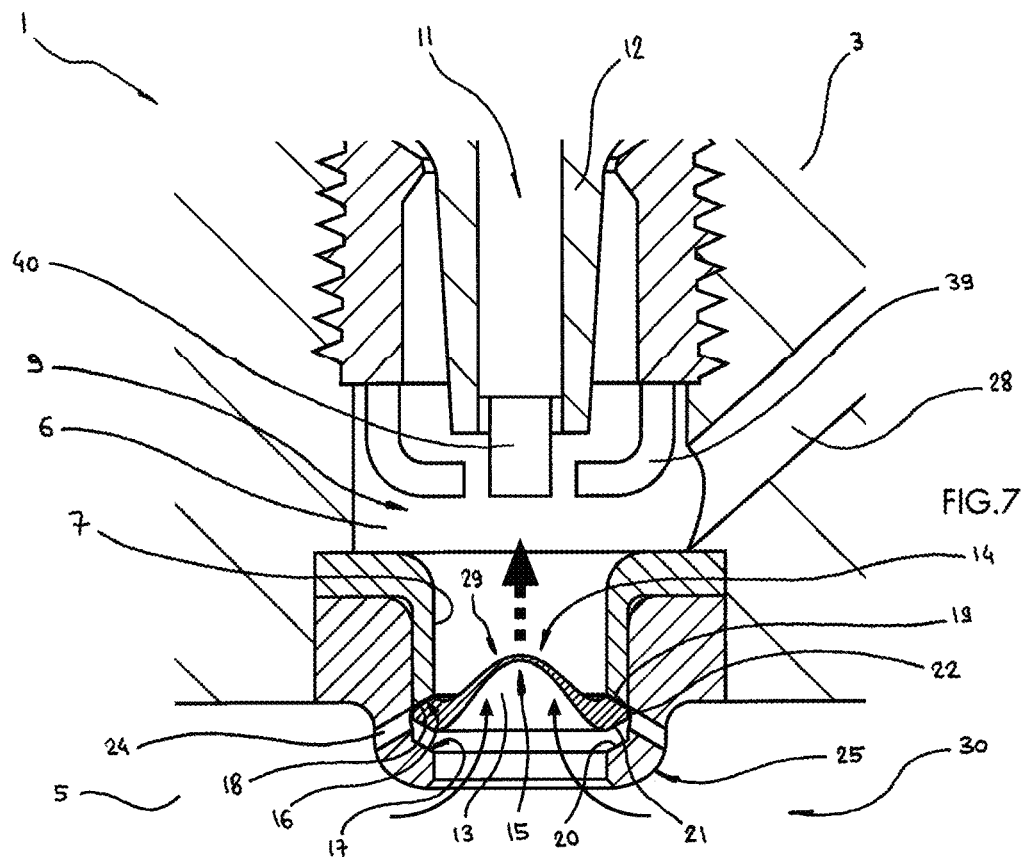

The lamination valve 13 remaining closed, as shown in FIG. 7, the piston 31 then initiates its expansion stroke and begins to transform into useful work much of the heat of the hot and burned gases of the main load 30. This work is transmitted to the crankshaft 37 by said piston 31 via the connecting rod 38.

In doing so, the pressure and the temperature prevailing in the combustion chamber 5 gradually decreases. When said pressure reaches sixty bars, for example, the pressure remaining in the lamination cavity 6 becomes greater than that prevailing in the combustion chamber 5.

Figure 8:
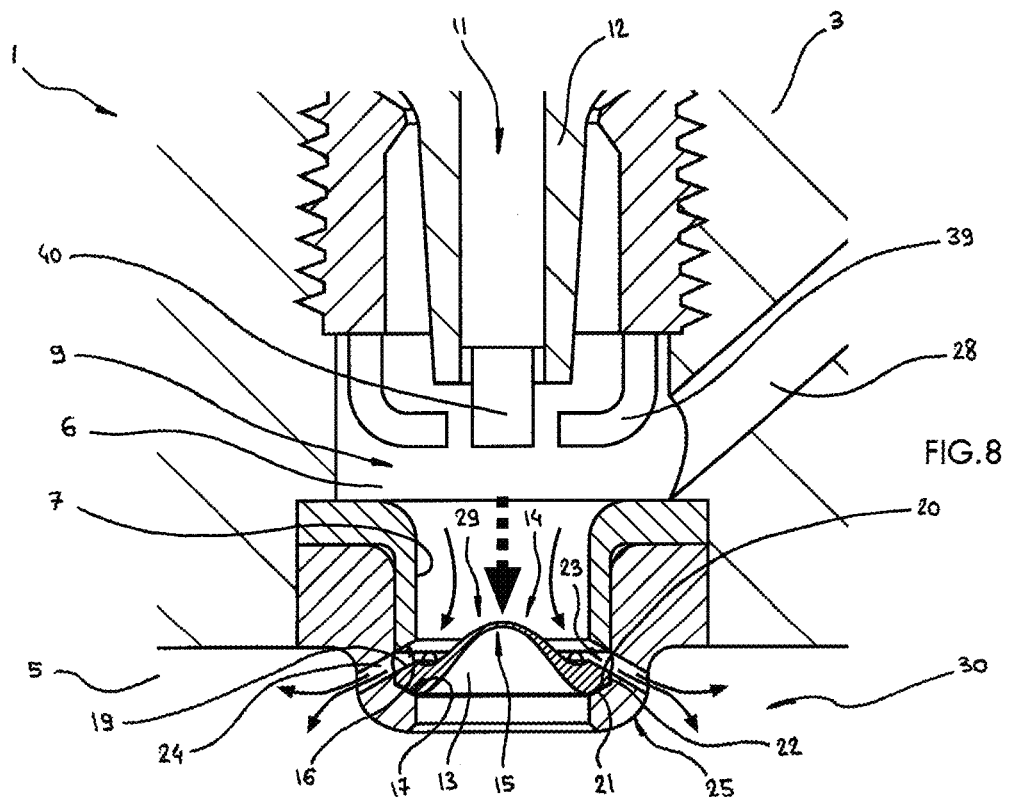

As a result of this situation, the chamber side valve seat 21 of the lamination valve 13 returns to its contact with the valve opening seat 20, as illustrated in FIG. 8. The lamination valve 13 again completely uncovers the gas ejection holes 24 and the residual hot gases of the pilot load 9 are ejected via said holes 24 in order to be expanded by the piston 31 while the expansion of the main load 30 continues.

Once the piston 31 has reached its Bottom Dead Center, the exhaust valve 35 opens and the gases end their expansion in the exhaust duct 33 before being actively pushed back by said piston 31 into said duct 33 when said piston 31 rises in the cylinder 4 towards its Top Dead Center.

During the entire exhaust stroke of the piston 31, the lamination cavity 6 can finish expelling the residual hot gases from the pilot load 9 via the gas ejection ports 24. This expulsion may also continue during the admission phase, which marks the start of the new four-stroke cycle designed/conceived by Otto/Beau de Rochas according to the usual sequencing.

As can be seen throughout the explanation that has just been given, unlike the known devices according to the state of the art, the valve ignition prechamber 1 according to the invention has allowed to limit the injection pressure of the pilot load 9 to approximately twenty bars.

This relatively low pressure has not only made it possible to limit the energy consumption of the lamination compressor 36, but also to limit its complexity in that a single compression stage was sufficient to reach said pressure.

In addition, only one decimal six percent of the fuel contained in the main load 30 sufficed to ensure a powerful ignition of said load 30—of the order of two hundred times more powerful than a conventional spark ignition—as well as for said ignition to occur in multiple locations homogeneously distributed in the three-dimensional space of the combustion chamber 5.

The low compression pressure of the pilot load 9, on the one hand, and the small amount of combustive agent-AF fuel mixture contained in said load 9, on the other hand, both helped to minimize the energy consumed by the lamination compressor 36 for compressing said pilot load 9.

Therefore, this allowed to minimize the amount of work that the lamination compressor 36 directly or indirectly applied on the crankshaft 37 of the internal combustion engine 2, which helped to maximize the final energy efficiency of said engine 2.

In addition, it will be noted that the time allowed for the lamination injector 8 for injecting the pilot load 9 into the lamination cavity 6 was almost equivalent to the time allocated to the compression phase of the internal combustion engine 2 according to the four-stroke cycle designed/conceived by Otto/Beau de Rochas. This allowed, on the one hand, to limit the dynamic sought for said injector 8 and, on the other hand, to limit the supply pressure of said injector 8. This helps in particular to reduce the cost and the complexity of said injector 8 while giving it better reliability, and great durability.

During the entire duration of the injection of the pilot load 9 into the lamination cavity 6, it will be noted that said load 9 was mixed with very little residual burned gas. The content of said burned gases in said load 9 before its spark ignition was only about one per thousand, which is extremely low.

As a result, the pilot load 9 has maintained a maximum flammability which, combined with a pressure of only 20 bars when the spark plug 12 ignited said load 9, allowed to limit the voltage to be applied to the terminal ends of said spark plug 12 to obtain said ignition. This results in a lower power consumption to power said spark plug 12, and added durability of the latter.

It will be noted that during the sequence of operation illustrated in successive steps from FIG. 3 to FIG. 8, the thermal load applied to the protruding ejection dome 25 was reduced to a bare minimum in that the gases raised to high temperature passed through the gas ejection holes 24 only once, against three for any ignition prechamber according to the state of the art, such a prechamber being devoid of lamination valve 13.

This particularity has allowed, in particular, to prevent said dome from rising to an excessively high temperature and forming a hot spot liable to cause untimely and uncontrolled ignitions of the main load, leading to rattling and to the damage or even the destruction of the internal combustion engine 2. In addition, this propensity of the protruding ejection dome 25 to remain at low temperature allows providing a high compression ratio for the internal combustion engine 2 without the risk of rattling.

Thus, the valve ignition prechamber 1 according to the invention allows to produce spark ignition internal combustion engines 2 operating under a high rate of cooled EGR, whatever the load and the rotational speed of said engines 2, and without compromising their combustion stability.

As a result of said high rate of EGR, the intake pressure of said engines 2 is naturally higher at partial loads than that of internal combustion engines 2 of the same design operating without cooled EGR. This reduces the pumping losses caused by the adjustment of the load by the intake pressure, said adjustment being for example operated by means of a butterfly.

In addition, the internal combustion engines 2 receiving the valve ignition prechamber 1 according to the invention have reduced thermal losses, as is the amount of nitrogen oxides per kilowatt hour produced by said engines 2. This results from the fact that the combustion of the main load 30 operates at a lower average temperature thanks to the possibility offered by the valve ignition prechamber 1 according to the invention to introduce cooled EGR in high proportions in said load 30.

In this context, made possible by the valve ignition prechamber 1 according to the invention, the compression ratio of the internal combustion engines 2 can be expected to be higher than that of the said same engines operating without cooled EGR, and without the risk of rattling. This is favorable to the efficiency of said engines 2.

It will further be noted that the reduction in pumping losses and heat losses induced by the valve ignition prechamber 1 according to the invention reduces the need to significantly decrease the displacement of the internal combustion engines 2 with ISO torque and ISO power by adding a boost, for example by turbocharger. Indeed, the boost may be either reduced or non-existent while high energy efficiency is maintained compared to the state of the art.

The set of characteristics and advantages conferred by the valve ignition prechamber 1 according to the invention allows obtaining internal combustion engines 2 with moderate cost price, low fuel consumption, low carbon dioxide emissions, and whose post-treatment of the pollutants is ensured by a simple three-way catalyst.

It will be noted that it is possible that the valve ignition prechamber 1 according to the invention be applied to domains other than just internal combustion engines. Said prechamber 1 can, for example, be applied to gas nailers, to firearms, or to any device requiring the firing of a main load by means of a pilot load with the highest possible efficiency.

The possibilities of the valve ignition prechamber 1 according to the invention are not limited to the applications which have just been described and it must also be understood that the foregoing description has been given only as an example and does not limit the scope of said invention which would encompass any other equivalent embodiment used in lieu of the ones described therein.

The invention claimed is:

1. A valve ignition prechamber (1) for an internal combustion engine (2) which comprises a cylinder head (3) which caps a cylinder (4) to form a combustion chamber (5) in which a main load can be burned (30), the valve ignition prechamber comprising:

at least one lamination cavity (6) which is arranged in the cylinder head (3) and is connected to the combustion chamber (5) by a lamination duct (7) and which also receives a lamination injector (8) which can directly or indirectly inject into said cavity (6) a pilot load (9) previously pressurized by compression means (10), said load (9) consisting of a combustive agent-AF fuel mixture easily flammable by means of a spark;

ignition means (11) which open into the lamination cavity (6) and which can ignite the pilot load (9);

a lamination valve (13) which can close all or part of the lamination duct (7) and which exposes both a cavity side face (14) subjected to the pressure of the gases prevailing in the lamination cavity (6), as well as a chamber side face (15) subjected to the pressure of the gases prevailing in the combustion chamber (11), said lamination valve (13) being able to translate with respect to said duct (7) under the effect of the pressure of the gases, either towards the lamination cavity (6) when said pressure prevailing in the latter is lower than the pressure prevailing in the combustion chamber (5), or towards said chamber (5) when the pressure prevailing in the latter is lower than the pressure prevailing in lamination cavity (6);

at least one cavity side valve stop (16) which determines the position of the lamination valve (13) closest to the lamination cavity (6); and at least one chamber side valve stop (17) which determines the position of the lamination valve (13) closest to the combustion chamber (5), said chamber side valve stop (17) comprising a valve opening seat (20) arranged in the lamination duct (7) or at either end of said duct (7), said valve opening seat (20) cooperating with a chamber side valve bearing surface (21) located at the periphery and/or at the end of the lamination valve (13), so that said valve opening seat (20) and said chamber side valve bearing surface (21) are in contact with each other, the lamination valve (13) forming with the lamination duct (7) a torch ignition prechamber (23) which simultaneously communicates with the lamination cavity (6) and with the combustion chamber (5) through at least one gas ejection hole (24).

2. The valve ignition prechamber according to claim 1, wherein the lamination valve (13) closes all or part of the lamination duct (7) when the lamination valve (13) is closest to the lamination cavity (6) while the lamination valve (13) opens said duct (7) on a wider section when the lamination valve (13) is positioned closest to the combustion chamber (5).

3. The valve ignition prechamber according to claim 1, wherein the cavity side valve stop (16) consists of a valve closing seat (18) arranged in the lamination duct (7) or at either end of said duct (7), said seat (18) cooperating with a cavity side valve seat (19) located at the periphery and/or at the end of the lamination valve (13).

4. The valve ignition prechamber according to claim 3, wherein the valve closing seat (18) and the cavity side valve bearing surface (19) create a seal when they are in contact with each other, said seal preventing any gas from passing at said contact when the pressure prevailing in the combustion chamber (5) is greater than the pressure prevailing in the lamination cavity (6).

5. The valve ignition prechamber according to claim 1, wherein the valve opening seat (20) and the chamber side valve bearing surface (21) create a seal when they are in contact with each other so as to prevent any gas from passing at said contact.

6. The valve ignition prechamber according to claim 1, wherein a periphery of the lamination valve (13) comprises guiding means (22) which maintain said lamination valve (13) approximately centered in the lamination duct (7), and approximately in the same longitudinal orientation as said duct (7), regardless of the axial position of said lamination valve (13) with respect to said duct (7).

7. The valve ignition prechamber according to claim 1, wherein the internal peripheral wall of the torch ignition prechamber (23) is cylindrical while the lamination valve (13) has a circular periphery and is housed at low radial clearance in said prechamber (23).

8. The valve ignition prechamber according to claim 1, wherein the lamination duct (7) opens projecting into the combustion chamber (5) in the form of a protruding ejection dome (25) which houses the torch ignition prechamber (23) and from which the gas ejection hole (24) opens.

9. The valve ignition prechamber according to claim 8, wherein the valve opening seat (20) is arranged in the protruding ejection dome (25).

10. The valve ignition prechamber according to claim 1, wherein when the lamination valve (13) is positioned close to the combustion chamber (5), that is to say, in the vicinity or even in contact with the chamber side valve stop (17) with which the lamination valve (13) cooperates, said lamination valve (13) uncovers at least one gas ejection hole (24) which connects the lamination cavity (6) to the combustion chamber (5).

11. The valve ignition prechamber according to claim 1, wherein the ignition means (11) consist of a spark plug (12) which closes the first end of a perforated connecting tube (26) which traverses all or part of the internal volume of the lamination cavity (6) and whose body is radially traversed by at least one radial slot (27) which connects the inside of said tube (26) with said internal volume, while the second end of said tube (26) receives the lamination duct (7) and the lamination valve (13), and while the central electrode (40) and the ground electrode (39) of said spark plug (12) are housed inside the perforated connecting tube (26).

12. The valve ignition prechamber according to claim 1, wherein the cavity side face (14) exposes an aerodynamic dome (29).

13. The valve ignition prechamber according to claim 1, wherein the cavity side face (14) forms a ground electrode (39) which faces a central electrode (40) comprised by a spark plug (12), the spark plug (12) constituting the ignition means (11).

14. The valve ignition prechamber according to claim 3, wherein the chamber side valve stop (17) consists of a valve opening seat (20) arranged in the lamination duct (7) or at either end of said duct (7), said seat (32) cooperating with a chamber side valve bearing surface (21) located at the periphery and/or at the end of the lamination valve (13), and wherein the lamination valve (13) is axially thicker at a periphery the lamination valve (13) which receives the cavity side valve bearing surface (19) and the chamber side valve bearing surface (21), than at a center of the lamination valve (13).

\* \* \* \* \*